United States Patent

[11] 3,622,869

[72] Inventor  Marcel J. E. Golay
             116 Ridge Road, Rumson, N.J. 07760
[21] Appl. No. 733,522
[22] Filed    May 31, 1968
[45] Patented Nov. 23, 1971
             Continuation-in-part of application Ser. No.
             649,539, June 28, 1967, now abandoned.
             This application May 31, 1968, Ser. No.
             733,522

[54] HOMOGENIZING COILS FOR NMR APPARATUS
     13 Claims, 41 Drawing Figs.
[52] U.S. Cl. .................................................. 324/0.5 R,
                                                              317/123
[51] Int. Cl. ....................................................... G01n 27/78
[50] Field of Search ............................................. 324/0.5;
                                                              317/123

[56]            References Cited
              FOREIGN PATENTS
     884,129  12/1961  Great Britain ................ 324/0.5

OTHER REFERENCES

I. Zupancic, Current Shims For High Resolution Nuclear Magnetic Resonance On The Problem Of Correcting Magnetic Field Inhomogeneities, Journal of Scientific Instruments, 39(12), December 1962, pp. 621–624.

Primary Examiner—Michael J. Lynch
Attorney—Edward R. Hyde, Jr.

ABSTRACT: A nuclear magnetic resonance apparatus adapted for homogenizing a field includes electrically insulated electroconductors positioned on pairs of plates and arranged for generating an incremental magnetic field in the vicinity of the sample and in the direction of the main field. The incremental field is represented by spherical harmonic functions. The incremental fields are substantially orthogonal for primary degree $n_p$ and order $m_p$. Arcuate and radial segments of the electroconductors are positioned on opposite surfaces of a plate with connections through the plate. The arcuate segments are radially spaced from a center thereof in a manner for reducing to a relatively low level, ancillary interferring harmonics which are also generated by the electroconductors. Means are also provided for combining orders of spherical harmonic functions to effect additional correction of interferring ancillary harmonics and to homogenize the field of a spinning sample.

INVENTOR.
Marcel Golay
BY
ATTORNEY.

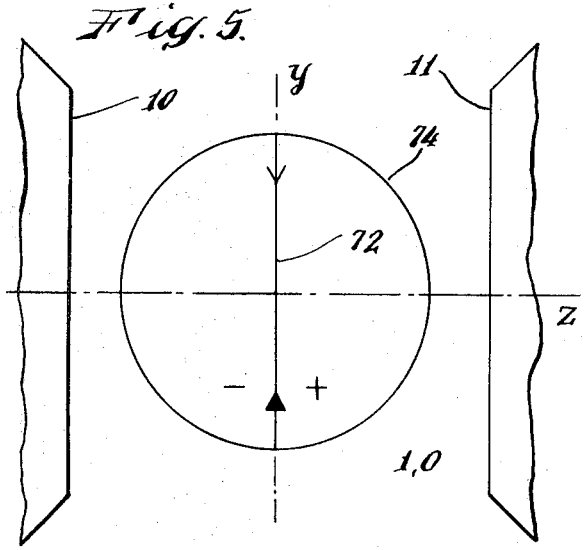
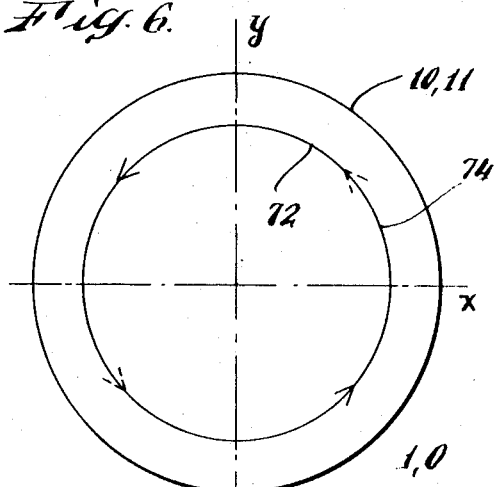
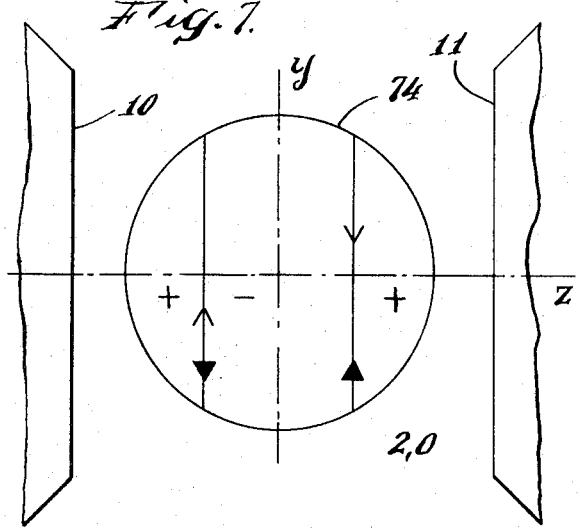
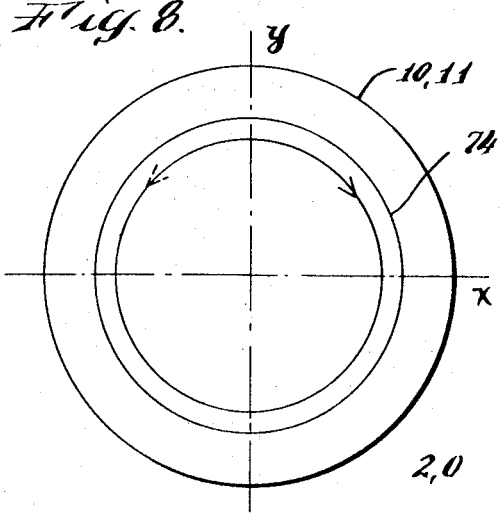
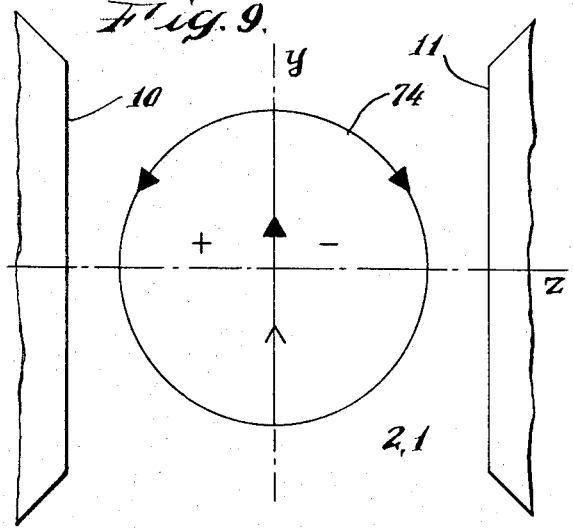
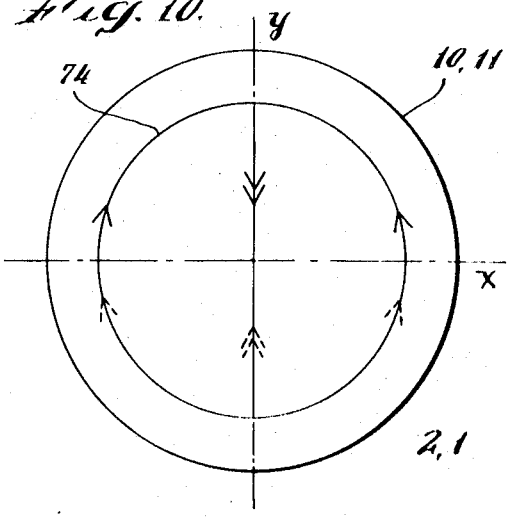

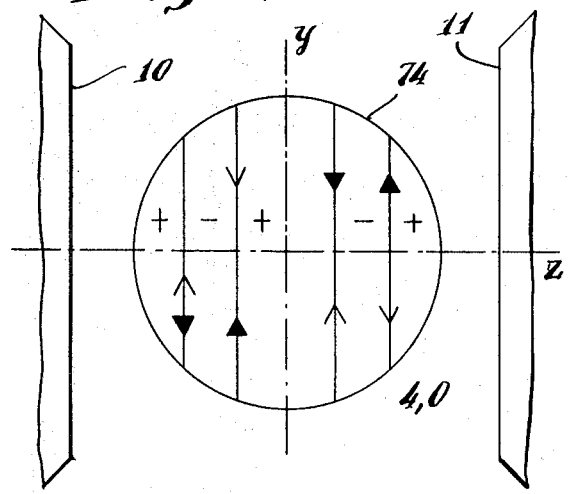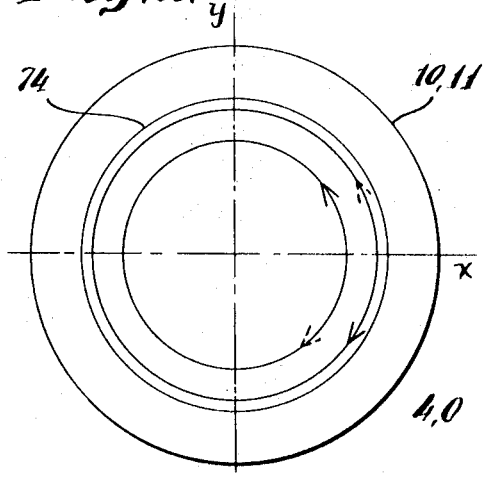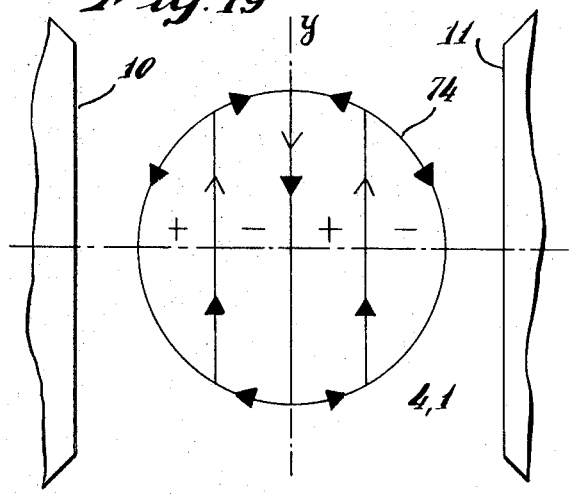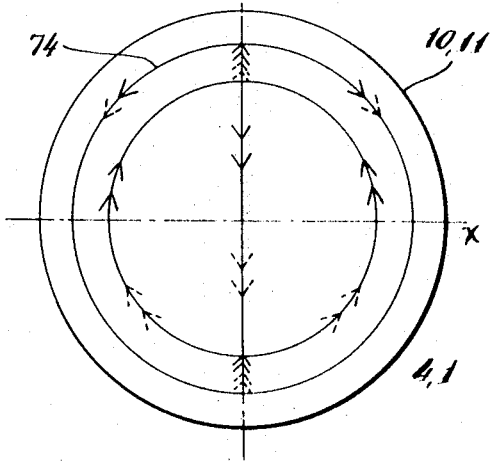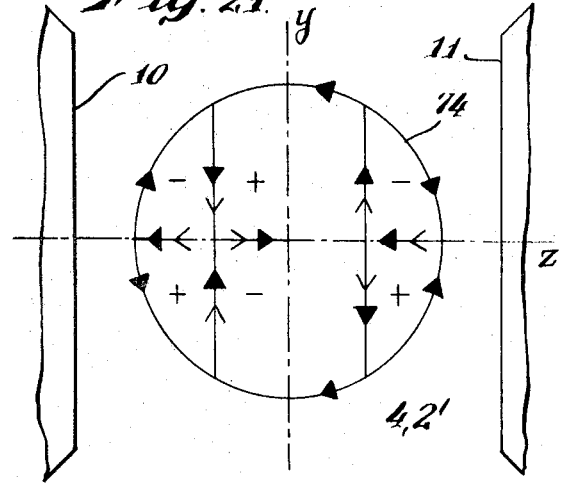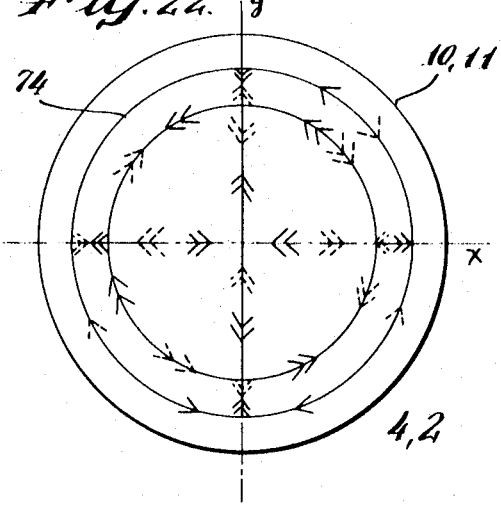

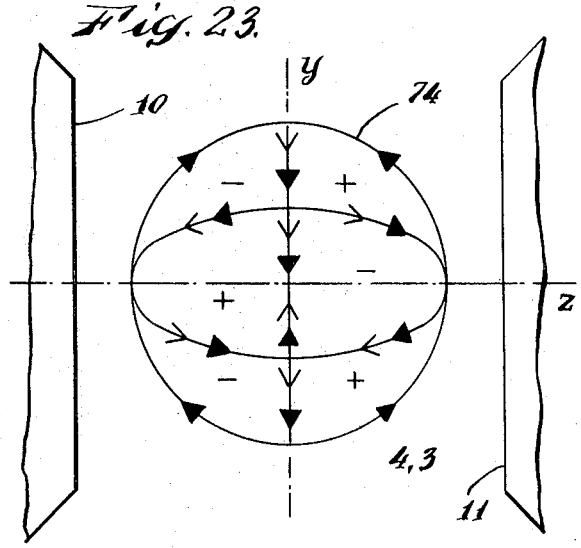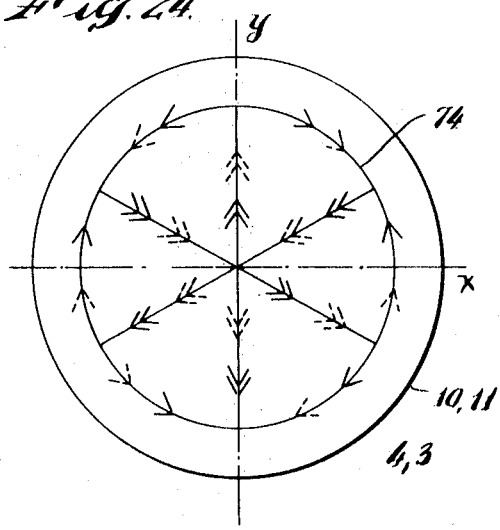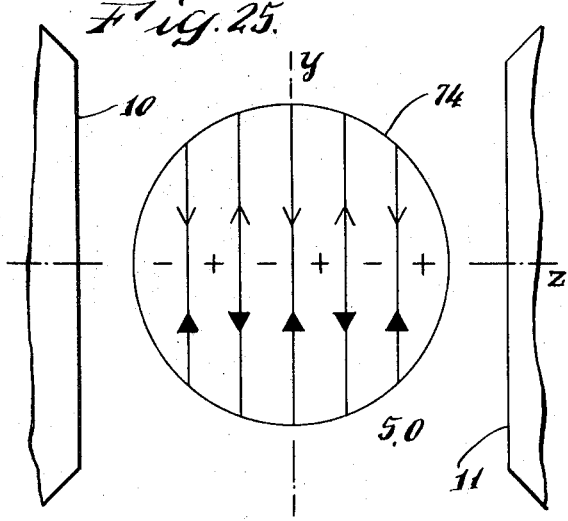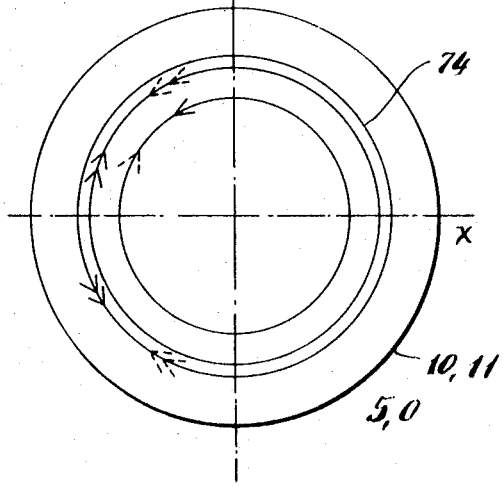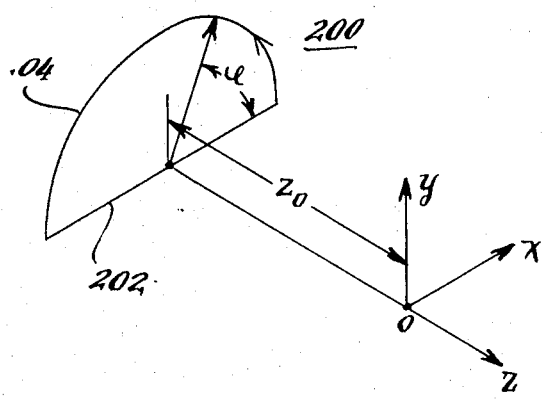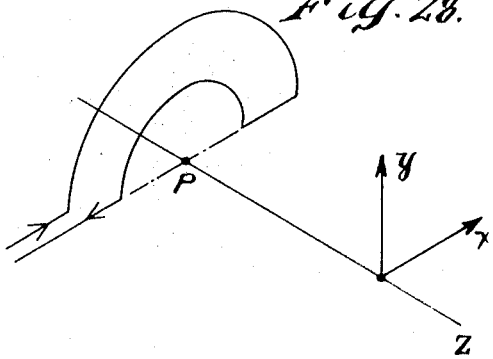

HOMOGENIZING COILS FOR NMR APPARATUS

This application is a continuation-in-part of U.S. Pat. application, Ser. No. 649,539, filed June 28, 1967, now abandoned.

This invention relates to nuclear magnetic resonance (NMR) apparatus adapted for analyzing substances by NMR techniques and more particularly to means for improving the uniformity of a magnetic field established by such apparatus.

NMR techniques have been employed in apparatus which function to identify a substance by an atomic analysis of the substance. In general, a sample under investigation is positioned in a relatively intense (1,000 to 23,000 Gauss) magnetic field of amplitude, $H_1$. The Larmour frequency ($f_0$) of the atomic nucleus of the substance is determined in one form of NMR instrument by superimposing a less intense alternating magnetic field $H_2$ of variable frequency on the steady field $H_1$ and noting the frequency of resonance. The gyromagnetic ratio ($I/u$) of a sample element, where $I$ represents the nuclear angular momentum and $u$ represents the magnetic moment of the nucleus, is thus determinable from a knowledge of the quotient of the intensity of the field, $H_1$, over the Larmour frequency ($f_0$). An identification of the particular element and isotope can therefore be realized.

Microanalytical apparatus of this type require that a highly homogeneous (i.e., uniform) field, $H_1$, exist in order that an accurate identification of the nuclei can be made. Nonuniformities in the field of an order as small as $10^{-6}$ in the vicinity of the sample can interfere with accurate identification. Prior NMR arrangements have employed field-correcting electroconductors, also termed field-homogenizing or shim coils, which generate corrective fields for improving field uniformity in the vicinity of the sample.

In an arrangement for homogenizing the field, one or more pairs of relatively flat electroconductors are positioned in a gap between two pole faces of a magnet which establishes the field $H_1$. The field is homogenized by manually varying the amplitude of currents flowing in the electroconductors until an acceptable field uniformity is established. These current adjustments are repetitive and become tedious and time-consuming because of interactions occurring between the fields established by the different electroconductors. In order to reduce the number of such current adjustments, each electroconductor has been arranged in a manner for generating an incremental magnetic field in the vicinity of the sample and in the direction of $H_1$. This incremental magnetic field can be represented by a spherical harmonic function. The orthogonal (i.e., independent) relationships existing between the spherical harmonic functions permit field-correcting current amplitude adjustments to be made in one electroconductor which theoretically will not alter the effectiveness of the field established by current flowing in another electroconductor. The number of current adjustments required to attain a desired degree of homogenization is thereby reduced.

In an ideal situation, a spherically shaped sample is placed in the center of coordinates in the gap center and the sample is uniformly radiated by the AC field $H_2$. Then, it is sufficient, in principle, to adjust the current in each coil only once. In practice, however, the sample may be massive, chunky, instead of spherical and the radiating field may depart from uniformity, in which case a typical arrangement will provide relatively good convergence towards an optimum setting of the current-amplitude-controlling means.

In order to provide a high-intensity uniform field and to avoid leakage flux phenomenon, it is desirable that the gap distance between the pole faces of the magnet producing the field $H_1$ be maintained at as small a value as is physically possible. The limiting value of this distance is determined by the dimensions of the apparatus required to support the sample and various coils in the gap. In general, the degree of homogenization provided is dependent upon the number of homogenizing coils employed. The use of many shim coils, one on each insulated sheet, in order to provide suitable homogenization, increases appreciably the required gap distance. Since the gap distance should be relatively small, a design compromise is drawn between the gap distance and the extent of field homogenization provided.

It is one object of this invention to provide a field-homogenizing means which occupy a reduced magnet gap distance while providing an increased degree of field homogenization.

Another object of this invention is to provide an improved arrangement of substantially noninteracting current-carrying homogenizing coils in each of which the currents can be adjusted to optimize some observable quantity such as the line width of some NMR line in a spectrogram, substantially independently of the adjustment of current in the other coils.

Another object of the present invention is to provide an improved arrangement for homogenizing the field of a nuclear magnetic resonance apparatus.

A further object of the invention is the provision of a plurality of planar homogenizing electroconductors adapted for generating a plurality of spherical harmonic functions and which are arranged in a substantially regular configuration.

Still another object of the invention is to provide a field-homogenizing arrangement having a physical configuration which facilitates the addition of electroconductors for increasing the degree of homogenization provided.

In prior apparatus, the homogenization of the field is effectively increased by spinning the sample under investigation about an axis. However, a spinning sample is also accompanied by modulation affects of a spherical harmonic order which at times are not correctable by shim coils adapted for use with a stationary sample.

It is another object of this invention to provide improved means for effecting homogenization of the magnetic field in the presence of either a stationary or a spinning sample.

Another object of the invention is to adapt a homogenizing means, which is provided for homogenizing the field about a stationary sample, in a manner for homogenizing the field about a spinning sample.

In accordance with the more general features of the present invention, an NMR apparatus adapted for homogenizing a field includes electrically insulated electroconductors positioned on pairs of plates and arranged for generating an incremental magnetic field in the vicinity of the sample and in the direction of the main field. The incremental field can be represented by spherical harmonic field functions referred to a system of coordinates in which the polar axis of the system is normal to the magnet pole pieces. These incremental fields are substantially orthogonal for their primary degree $n_p$ and order $m_p$, i.e., for the degree and order of the potential function they are specifically designed to generate. The electroconductors are supported by a single pair of plates, the individual plates of the pair being positioned at opposite pole faces of the device. The electroconductors include arcuate and radial segments respectively positioned on opposite surfaces of the plate with connections through the plate, the arcuate segments being radially spaced from a center thereof in a manner for reducing to a predetermined relatively low level, some of the ancillary interfering harmonics which are also generated by the electroconductors. Circuit means are additionally provided for effecting cancellation of the remaining interfering ancillary harmonics. In a particular arrangement, a plurality of such electroconductors are formed as relatively thin flat conductors by printed circuit techniques. Thus, the arcuate and radial electroconductor configuration provides on pairs of plates, electroconductors adapted for generating a plurality of primary spherical harmonics. In this manner, a relatively large degree of field homogenization is advantageously provided by a configuration occupying a relatively small portion of the gap distance.

In accordance with another feature of the present invention, means are provided for combining orders of spherical harmonic functions which are adapted for homogenizing the field of a stationary sample, in a manner for homogenizing the field of a spinning sample.

These and other objects and features of the invention will become apparent with reference to the following specifications and drawings wherein:

FIGS. 5, 7, 9, 11, 13, 15, 17, 19, 21, 23 and 25 are diagrams illustrating the locus of current paths on a sphere of electrically insulative material and which generate magnetic fields at the center of the sphere which are represented by spherical harmonic functions;

FIGS. 6, 8, 10, 12, 14, 16, 18, 20, 22, 24 and 26 are diagrams illustrating generally the projection of current paths which have the morphology of the current paths of FIGS. 5, 7, 9, 11, 13, 15, 17, 19, 21, 23 and 25 respectively projected on pole faces of the magnet of the instrument of FIG. 1;

FIG. 27 is a diagram utilized for determining the magnitude of ancillary harmonic functions at a point in the magnet gap;

FIG. 28 is a diagram of a portion of an electroconductor for establishing a spherical harmonic corrective field of order $m=1$ and illustrating a semicircular configuration of arcuate conductive segments;

Figure 1:
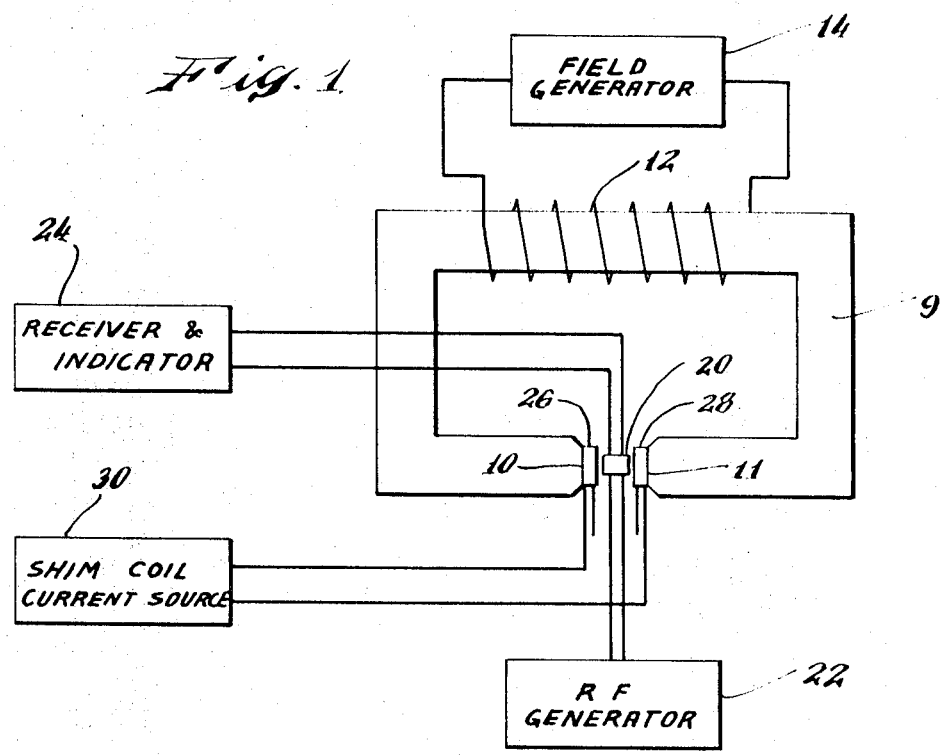
FIG. 1 is a diagram illustrating a nuclear magnetic resonance instrument.

To a large extent, the field-corrective considerations applicable to a stationary sample are similarly applicable to a spinning sample. Accordingly, the following discussion will initially describe the generation of homogenizing coils with respect to a stationary sample and, subsequently, the generation of homogenizing coils with respect to a spinning sample.

Although the use of mathematical spherical harmonic functions with respect to the homogenizing fields generated in NMR apparatus is known, it is believed that features of the present invention may be better understood from the following simplified considerations of these functions. The component $H_z$ of the magnetic field intensity in the direction of the polar axis $z$, established at a point in a gap between pole faces of the magnet, has the property that its Laplacian vanishes. Stated mathematically, $$\Delta^2 H_z = \Delta \cdot \Delta H_z = \frac{\partial^2 H_z}{\partial x^2} + \frac{\partial^2 H_z}{\partial y^2} + \frac{\partial^2 H_z}{\partial z^2} = 0 \qquad (1)$$

This same property is applicable to a distorting inhomogeneous field which, if added to a uniform field having the average intensity and direction of the actual field at the airgap center, produces the actual, inhomogeneous field in the region of interest near the airgap center. It is also applicable to individual incremental corrective fields which can be generated by homogenizing coils traversed by electrical currents. It is known, also, that in the immediate neighborhood of any point and in particular of an origin of coordinates any distorting field can be expressed as the sum of incremental fields each of which is representable by a spherical harmonic referred to a polar coordinate system centered in said origin of coordinates in which the $z$ or polar axis passes through the airgap center and is normal to the pole faces, said spherical harmonics possessing no singularity in said origin. Such spherical harmonics satisfy equation (1). In practice, the effect of the perpendicular distorting fields is negligibly small. Therefore, if a multiplicity of electroconductors is provided, each of which when traversed by electrical current produces an incremental field with a component parallel to the main field which is expressed substantially by a spherical harmonic, then it is possible to decrease the inhomogenities in the initial field produced by the magnet by means of substantially orthogonal (independent) current controls. Furthermore, the greater the number of individual electroconductors of the type just described that are provided, the greater will be the corresponding number of spherical harmonic functions generated by these electroconductors. Consequently, a corrective field can be more closely approximated by the superposition of these harmonic functions and the field homogenization accomplished will be the greater. Although, for ease of description, an electroconductor is referred to in the specification as generating a spherical harmonic, it will be understood that the current-carrying electroconductors establish magnetic fields in the $z$ direction as well as more generally, magnetic potentials, which are expressible as spherical harmonics.

Spherical harmonic functions can be derived in a well-known manner from the Legendre functions. The spherical harmonic functions describing various incremental fields parallel to the main field are of the forms:

first degree harmonic function: $z$, $x$ and $y$     (2)

second degree harmonic function: $2z^2-x^2-y^2$, $xz$, $yz$, $x^2-y^2$, and $xy$     (3)

third degree harmonic function: $2z^3-3z(x^2+y^2)$, $x[4z^2-(x^2+y^2)]$, $y[4z^2-(x^2+y^2)]$, $(x^2-y^2)z$, $xyz$, $x^3-3xy^2$ and $3x^2Y-y^3$     (4)

The first degree fields can be obtained (neglecting an inconsequential numerical factor) as the differentiation with respect to $z$ of the zonal and two tesseral harmonic functions: $2z^2-(x^2+y^2)$, $zx$, and $zy$,     (3) which will be designated hereinafter by the codes (2,0); (2,1) and (2,1)' respectively.

Similarly, the second degree fields can be derived from the zonal and tesseral harmonic function of third degree and will have the codes: (3,0); (3,1); (3,1)'; (3,2); (3,2)'; etc., and more generally will have the codes $(n,o)$ for zonal harmonics and $(n,m)$ or $(n,m)'$ with the $n>m>o$ for tesseral harmonics, sectorial harmonics with the code $(n,n)$ not being considered here because they correspond to fields perpendicular to the main field and of little importance as explained earlier. In general, $n$ designates the degree of the harmonic potential from which a field of degree $(n-1)$ can be obtained by differentiation with respect to $z$ and $m$ designates the order of the harmonic potential which is also the order of the spherical harmonic of the field derived from it. Since sectorial and tesseral harmonic functions, (i.e., $m>0$) occur in pairs, then hereinafter the second of the pair will be distinguished from the first of the pair by a prime symbol; e.g., (2,1) and (2,1)'; and generally, ($n,m$) and ($n,m$)'.

A rigorous configuration for generating the spherical harmonic functions comprises a plurality of continuously distributed surface currents flowing on a sphere which is centered about the sample point in the magnet gap. However, the placement of a sphere in the magnet gap would physically interfere with the placement of the sample under analysis in the gap and continuously distributed currents on a surface are technically unfeasible. A practical arrangement for field correction has taken the form of a group of electrically insulative thin flat plates mounted near each of the pole faces in the gap, each of which supports thin flat electroconductors generating substantially, in the region of interest, a field represented by a desired spherical harmonic function of degree ($n$) and order ($m$). Because of this planar configuration and the finite dimensions of the current-carrying electroconductors, other harmonics in addition to the desired spherical harmonic of degree ($n$) and order ($m$) will be generated. Hereinafter, the spherical harmonics which it is desired to generate are referred to as primary spherical harmonics while the undesired additionally generated harmonics are referred to as ancillary harmonics. When the electroconductors are symmetrically arranged as indicated hereinafter, the undesired ancillary harmonics are of an order which is an odd multiple of $m$: $3m$, $5m$ etc., or have a degree which differs from $n$ by an even integer, or both. It is another object of the present invention to provide homogenizing coils in which several of the ancillary harmonics are reduced to a negligible value.

The NMR instrument illustrated in FIG. 1 includes a magnet for producing a main field of desired intensity, $H_1$. This magnet, of the electromagnet type, comprises a ferromagnetic core 9 having a gap between pole faces 10 and 11 thereof and a winding 12. A current source 14 for causing a current to flow in the winding 12 is provided for establishing the magnetic field of intensity $H_1$. Alternatively, the magnet may comprise a permanent magnet rather than an electromagnet. A sample under analysis is positioned in the gap and supported by conventional means, indicated generally by the rectangle 20. This support means 20 houses in addition, a field coil (not shown) for establishing an alternating field of intensity $H_2$ in a plane perpendicular to the field $H_1$ of the magnet as well as an inductive pickup coil (not shown) having an axis orientated perpendicularly both with respect to the field $H_1$ and the field $H_2$. The support means 20 is adapted for spinning the sample under investigation or for supporting it in a stationary mode. An RF signal generator 22 is coupled to the field coil for generating a field $H_2$. This field coil is excited at an RF frequency, or over a range of RF frequencies, while a signal receiver and indicating means 24 is coupled to the pickup coil in the gap for detection and indication of nuclear magnetic resonance.

In operation, the Larmour frequency $f_o$ of the sample under investigation is determined by establishing a steady field $H_1$ and varying the excitation frequency $f_1$ of the field $H_2$ until a resonance is determined, as evidenced by a greatly increased signal output from the pickup coil. Alternatively, the RF frequency $f_1$ is held constant and the magnitude of the field $H_1$ is cyclically varied, such as at a 60-cycle rate. The gyromagnetic ratio ($1/u$) is related to the ratio of the field $H_1$ over the Larmour frequency $f_o$, and thus may be calculated. This general NMR apparatus and technique is well known and further elaboration is not deemed necessary.

Figure 2:
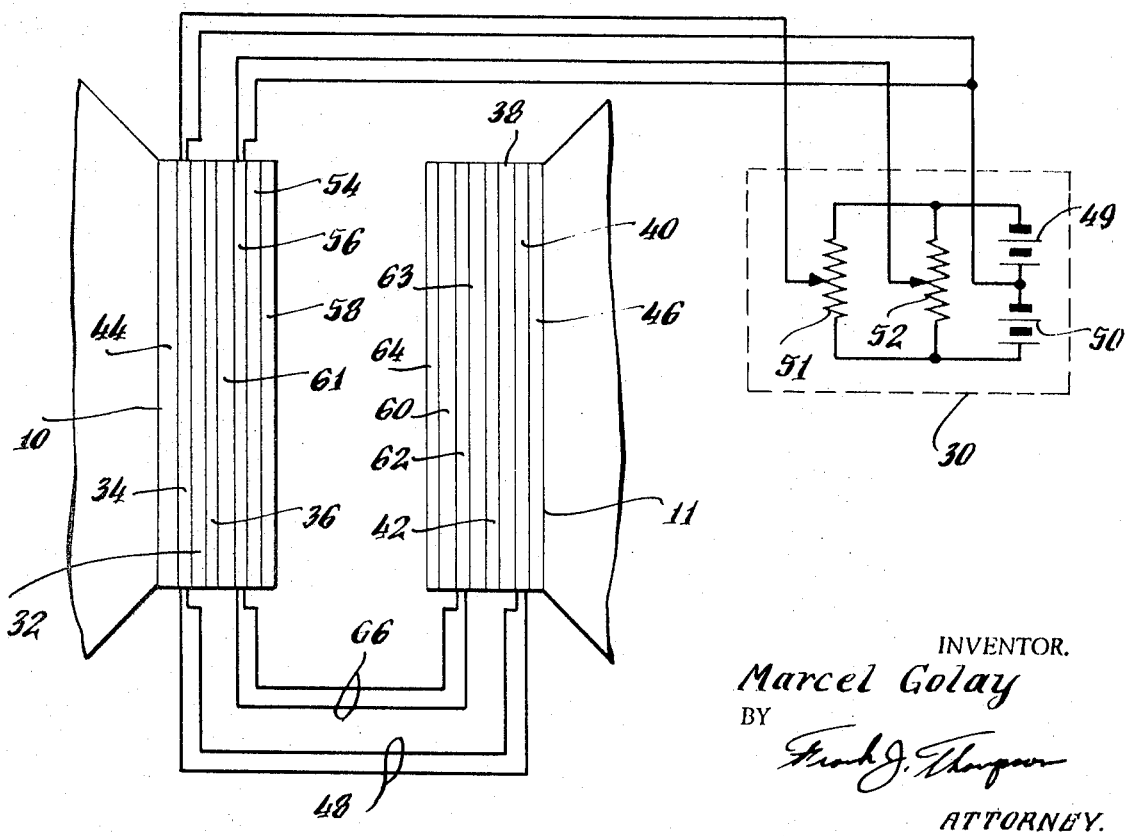
FIG. 2 is an enlarged view of the gap in a magnet of the instrument of FIG. 1 illustrating an assembly of plates upon which are supported homogenizing electroconductors fabricated in accordance with the present invention.
Figure 3:
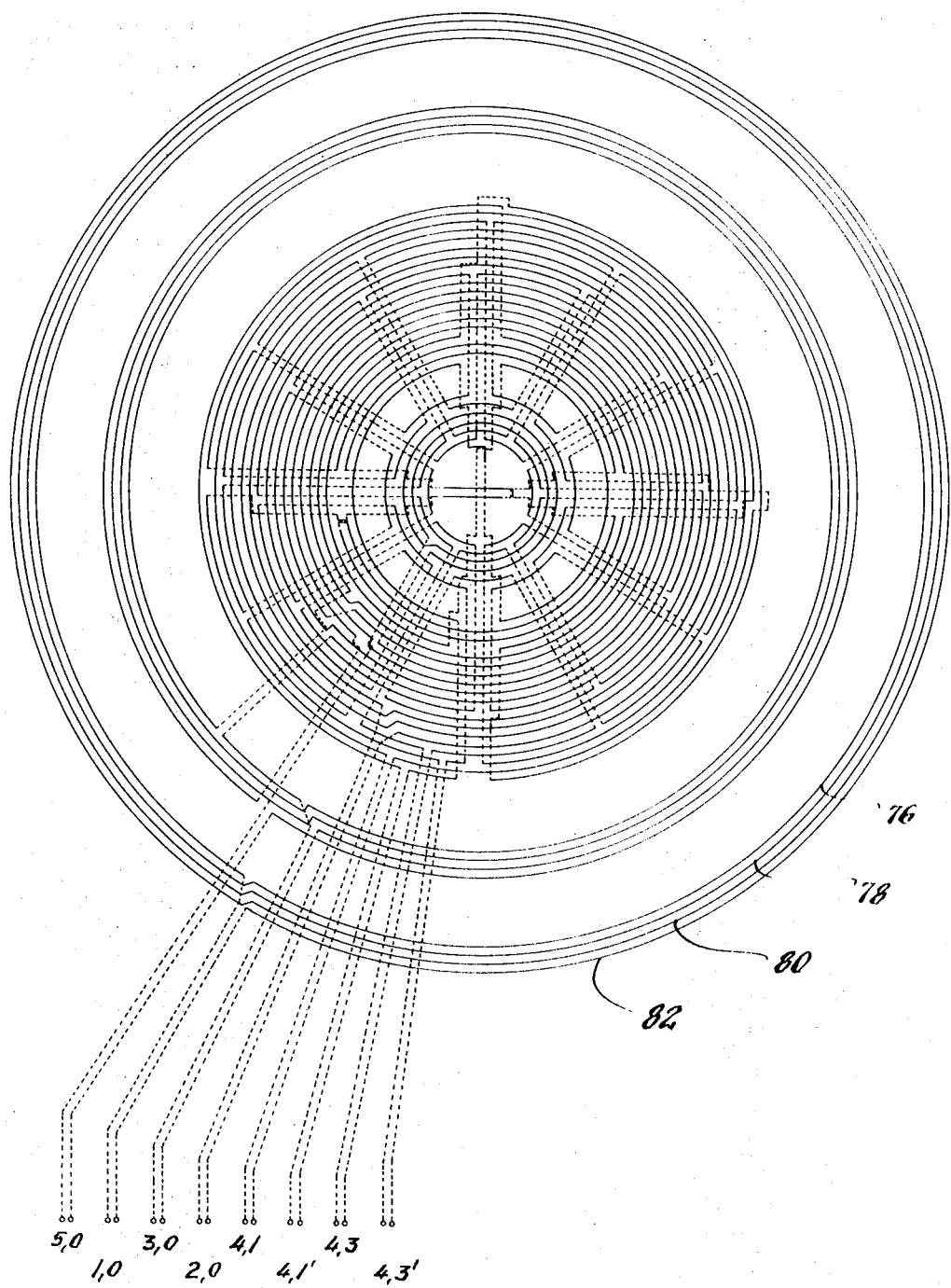
FIG. 3 is a diagram illustrating one plate of a first pair of plates having a plurality of homogenizing electroconductors constructed in accordance with the present invention.
Figure 4:
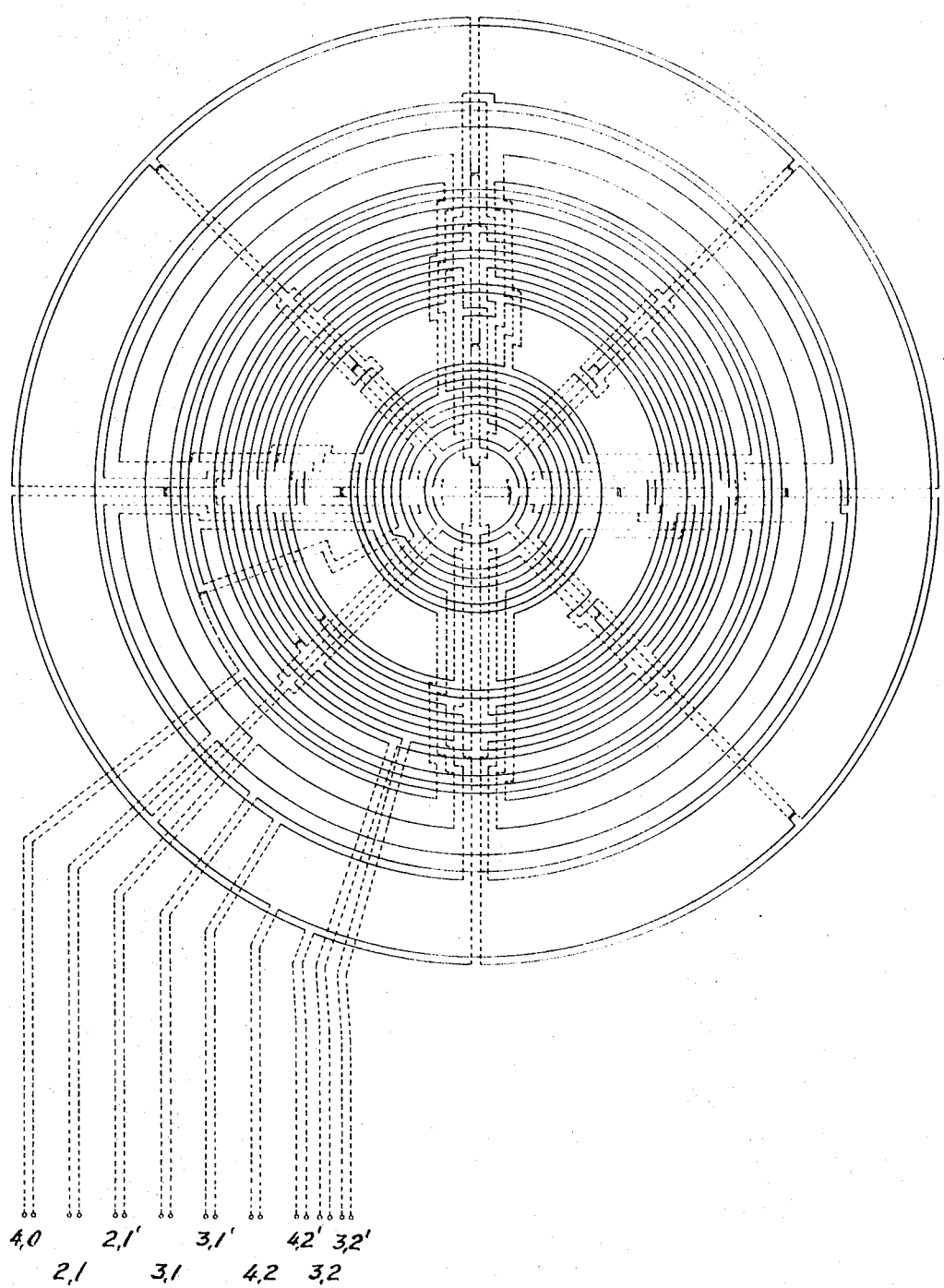
FIG. 4 is a diagram illustrating one plate of a second pair of plates having a plurality of homogenizing electroconductors constructed in accordance with the present invention.
Figure 11:
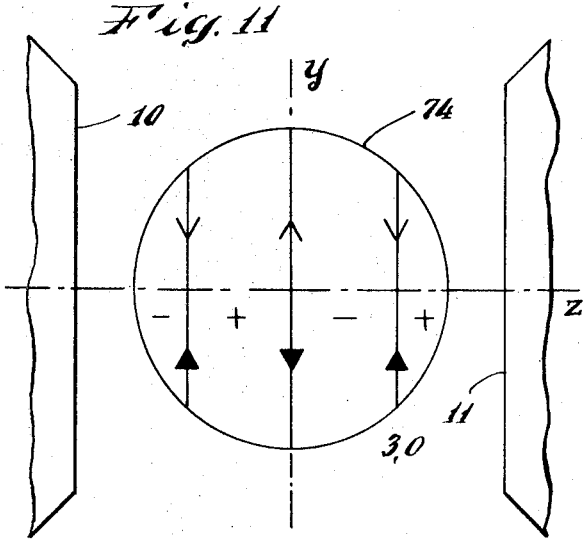

In accordance with features of this invention, a plurality of relatively thin field-homogenizing electroconductors are supported by first and second plates at opposite pole faces 10 and 11 respectively and are adapted for generating correction fields represented by an equal plurality of primary spherical harmonic functions. The general arrangement of the plates in the magnet gap is illustrated in FIGS. 1 and 2 while a particular configuration of the electroconductors is illustrated in FIGS. 3 and 4. As indicated in greater detail hereinafter, associated electroconductors are supported by the first and second plates for generating a primary spherical harmonic function. A DC current is caused to flow in electroconductors of each of these plates from an adjustable current source, indicated generally as 30. In a particular arrangement of the present invention, as illustrated in FIGS. 3 and 4, two pairs of plates provide 17 spherical harmonic functions, 16 of which are corrective, which is equivalent, generally, to the number of corrective functions previously provided by 16 pair of plates. One electroconductor of the group of 17 is provided for varying the main field by a minute amount, when required by the particular NMR arrangement employed.

FIG. 2 is an enlarged view of the magnet gap of FIG. 1 illustrating in greater detail an arrangement of the two pairs of plates which are fabricated by printed circuit techniques. A first plate of a pair positioned near pole face 10 comprises a thickness of insulating material 32, such as Mylar 0.005 inches in thickness, supporting on opposite surfaces thereof, two thin metal foils 34 and 36, such as copper 0.001 inches in thickness. An arrangement of this type may comprise a double-clad printed circuit board. The other plate of the pair positioned near pole face 11 comprises a double-clad circuit board having a thickness of insulating material 38 and metal foils 40 and 42. Electroconductors are formed from the metal foils of the plate in a manner indicated in greater detail hereinafter. This pair of plates is electrically insulated from the metallic pole faces 10 and 11 by Mylar insulating material 44 and 46 respectively, and are secured by any suitable means such as a nonmagnetic, adhesive material. An epoxy resin glue is a typical nonmagnetic adhesive material. Associated electroconductors on the pair of plates which operate to generate a particular spherical harmonic function are coupled in series by leads indicated generally by the wires 48. Current flows in the electroconductors, for each function, from the current-amplitude-adjusting means 30 which includes the sources of potential 49 and 50 and potentiometer 51. A second pair of plates comprises the double-clad printed circuit boards formed by the insulator 54 and metal foils 56 and 58 and by the insulator 60 and metal foils 62 and 64. The electroconductors formed on this pair of plates are similarly coupled in series by leads 66 and current flows therein from the potential sources 49 and 50 via a potentiometer 52 of the current-amplitude-adjusting means 30. The adjacent plates of both pairs are insulated from each other by insulators 61 and 63.

FIG. 3 illustrates the electroconductor arrangement of one plate of a pair of field-homogenizing plates while FIG. 4 illustrates the electroconductor arrangement of one plate of a second pair of field-homogenizing plates. For purposes of clarity in the drawings, these electroconductors are shown enlarged on the order of three to five times their actual dimensions. Similar plates of the pairs are provided for mounting adjacent the opposite pole face of the magnet. The plate of FIG. 3 is represented in FIG. 2 by the double-clad board comprising the insulator 32 and foils 34 and 36 while the plate of FIG. 4 is represented by the insulator 54 and foils 56 and 58. It can be seen from FIGS. 3 and 4 that these electroconductors include generally arcuate segments, shown in solid line, formed from the metal on one side of the plate and radial segments, shown in dashed line, formed from the metal on an opposite side of a same plate. Conductive connections are made through the insulative material between the arcuate and radial segments as indicated in FIGS. 3 and 4. The arcuate electroconductors associated with a particular primary spherical harmonic function are positioned spatially in a manner for generating substantially orthogonal correction for the primary degree and order ($n_p, m_p$) in the vicinity of the sample while reducing the generation of ancillary spherical harmonics at the same point in the gap.

The electroconductor configurations of FIGS. 3 and 4 are generated in the following manner. When a conductor, traversed by a current, is positioned on the surface of an insulative sphere and along the locus of a particular spherical harmonic function where the function vanishes, with the current flowing in the direction faced by an observer having the positive values of the function on his left and negative on his right, the sphere being centered about the sample point in the magnet airgap and the electroconductor having a unity current flowing therein, then a magnetic field is generated which, at the center of the sphere, approximates to a relatively high degree, said spherical harmonic function. By projecting the several geometrical configurations of the current flow loci as viewed from the center of the insulative sphere to the flat magnet pole faces, groups of concentric circles as well as radial spokes are obtained on a common plane. These projected configurations of the current flow loci generate fields at the center of the current flow loci generate fields at the center of the sphere which are orthogonally related for what will be termed the primary degree $np$ and primary order $mp$: $(n_p, m_p)$.

Although an electroconductor arrangement for establishing fields represented by spherical harmonics of primary degree and order $(n_p, m_p)$ is theoretically achieved in this manner, such an arrangement of electroconductors of finite dimensions in a common plane formed to generate a particular desired spherical harmonic of primary degree and order $(n_p, m_p)$ also generates ancillary, i.e., undesired, spherical harmonics generally of the same order and of the degree $n_p-2$, $m_p$; $n_p-4,m_p$; .. $n_p+2,m_p$; $n_p+4,m_p$; ... with always $n-2s=m$, as well as ancillary harmonic generations of the same degree and of order $3m,5m$, etc., or again of a different degree of the same parity and of order $3m,5m$, etc. The ancillary harmonics generated by one electroconductor interfere with the primary harmonics generated by other electroconductors and impair the desired orthogonality. In accordance with a feature of this invention, the electroconductors are spatially arranged in a manner indicated hereinafter, for reducing interfering harmonics at the sample point.

The following description exemplifies the detailed generation of a set of shim coils by their projection upon the by their projection upon the magnet pole faces. This set includes 17 primary spherical harmonic potential functions $(n,m)$; (1,0); (2,0); (2,1); (2,1)'; (3,0); (3,1); (3,1)'; (3,2); (3,2)'; (4,0); (4,1); (4,1)'; (4,2); (4,2)'; (4,3); (4,3)'; and (5,0). This group of 17 functions is considered typical for correcting field inhomogenities occurring with NMR magnets. It has been noted that sectorial harmonic correction (i.e., $n=m$) is not provided since fields which could be corrected by such harmonics are normal to the field $H_1$. They have a negligibly small quadratic effect on the latter when they are smaller than the main field by a factor of $10^{-4}$, which is known to be the case for magnets of the type employed with NMR apparatus.

The following table I lists these 17 harmonics and the corresponding figures where the locus is plotted and projected. Table I lists these harmonics and their expressions in Cartesian coordinate form.

TABLE I

| Spherical harmonics | | Spherical harmonic functions in cartesian coordinates | Locus plotted on sphere in figure | Locus projected on pole face in figure |
|---|---|---|---|---|
| Deg. | Order | | | |
| 1 | 0 | $z$ | 5 | 6 |
| 2 | 0 | $2z^2-x^2-y^2$ | 7 | 8 |
| 3 | 0 | $z[2z^2-3(x^2+y^2)]$ | 11 | 12 |
| 4 | 0 | $8z^4-24z^2(x^2+y^2)+3(x^2+y^2)^2$ | 17 | 18 |
| 5 | 0 | $z[8z^4-40z^2(x^2+y^2)+15(x^2+y^2)^2]$ | 25 | 26 |
| 2 | 1 | $zx$ | 9 | 10 |
| 2 | 1' | $zy$ | | |
| 3 | 1 | $x(4z^2-x^2-y^2)$ | 13 | 14 |
| 3 | 1' | $y(4z^2-x^2-y^2)$ | | |
| 4 | 1 | $xz[4z^2-3(x^2+y^2)]$ | 19 | 20 |
| 4 | 1' | $yz[4z^2-3(x^2+y^2)]$ | | |
| 3 | 2 | $z(x^2-y^2)$ | 15 | 16 |
| 3 | 2' | $xyz$ | | |
| 4 | 2 | $(6z^2-x^2-y^2)(x^2-y^2)$ | 21 | 22 |
| 4 | 2' | $(6z^2-x^2-y^2)xy$ | | |
| 4 | 3 | $zx(x^2-3y^2)$ | 23 | 24 |
| 4 | 3' | $zy(3x^2-y^2)$ | | |

The generation of the electroconductors for establishing the spherical harmonic (1,0) will first be considered. Locus arrangements for the other primary functions and their spatial arrangement will be described hereinafter. It should be noted that the primary (1,0) function is the only one of the above functions which does not provide field correction and thus may be employed for generating a sweep of $H_1$ as indicated hereinbefore. However, its generation is typical and the general procedure for its generation can be followed for the other four zonal harmonics. In FIG. 5 an electroconductor 72, which is adapted for generating this spherical harmonic, is illustrated as being wound about an insulative sphere 74. In the FIGS. 5, 7, 9, 11, 13, 15, 17, 19, 21, 23 and 25, the sphere 74 is assumed positioned in the magnet gap of FIGS. 1 and 2 and the $z$-axis coincides with the axis of the circular pole faces 10 and 11. The $y$- and $z$-axes are oriented in the plane of the paper as shown while the $x$-axis is normal to the plane of the paper and directed downwards. The open and solid arrow heads of these FIGURES indicate the direction of current flow in the electroconductor in upper and lower hemispheres respectively of the sphere 74, and solid arrows are also used to indicate current direction in the $xz$ plane. (In the upper hemisphere, $x<0$ while in the lower hemisphere $x>0$.) The signs of the potential function generated by the currents and shown in FIGS. 5, 7, ... 25 are for the upper hemisphere ($x<0$). It is assumed that the center of the sphere is a unity distance from the pole faces 10 and 11 (i.e., $z=+1$ and $-1$ respectively at the pole faces). FIGS. 6, 8, 10, 12, 14, 16, 18, 20, 22, 24, 26 illustrate the projections of the electroconductors of the function (1,0) and of other spherical harmonic functions from the center of sphere 74 onto the pole faces 10 and 11 as viewed from the $+z$ direction, i.e., from the right. In several figures inner windings are slightly reduced in size from a strictly linear projection to avoid crowding. Open directional arrow heads indicate the direction of current flow in the electroconductor for the projection on face 10 while dotted arrow heads indicate the direction of current flow for the projection on face 11. For the purpose of this specification and the appended claims, the following additional conventions are observed. With respect to polarity, it is stipulated that an observer walking along the winding on the sphere in the direction of current flow will have negative values of the harmonic on his right and positive values of the harmonic on his left. Equatorial lines in the $x-y$ plane which would project to infinity on assumedly infinitely extended pole faces are replaced by two symmetric parallels near the equator which then project at a finite distance. Only one of each pair $(n,m)$ and $(n,m)'$ has been illustrated, the other one of the pair being obtained by clockwise (c.w.) or counterclockwise (c.c.w.) rotation of $\pi/2m$ around the $z$-axis.

It will be observed that the currents flow in the same direction in the two windings when $n+m$ is odd, and in opposite directions when $n+m$ is even. This results from the fact that the powers of $z$ in the potential functions have the polarity of $m+n$, and have the opposite polarity in the expressions for $H_z$ which are the derivatives with respect to $z$ of the expressions for the potential.

Figure 38:
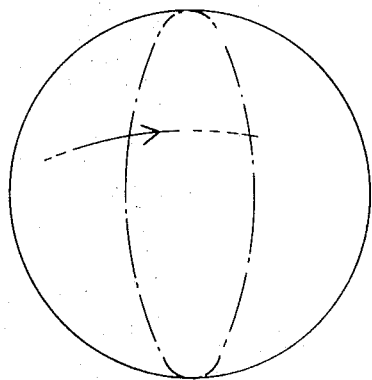
FIG. 38, 39, 40 and 41 is a perspective view of a sphere having windings positioned thereon and helpful in visualizing current paths.
Figure 39:
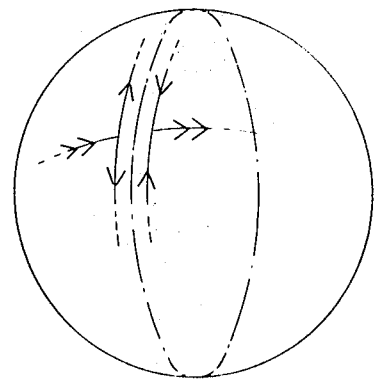
Figure 40:
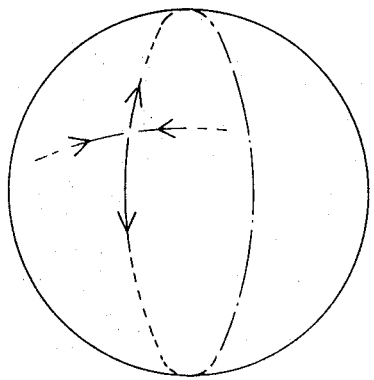
Figure 41:
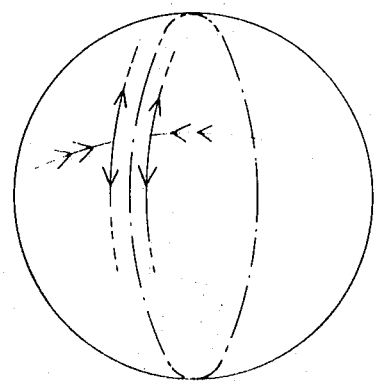

In all cases where $m>0$, the locus lines which in the figures appear to provide a junction point of four leads not located on the equator actually represent two or a greater even number of separate conductors which approach the junction point and turn away immediately before contacting. Meridians intersecting the $x-y$ plane at $z=0$ which would project to infinity, are divided into two segments at a distance from the $x-y$ plane at $z=0$ and continue along the two halves of a parallel circle, as is illustrated hereinafter for example in connection with the primary (3,1) function electroconductors of FIGS. 13 and 14, so that these projections on the pole faces are at a finite distance, as illustrated in perspective in FIGS. 38 and 39. The double arrows indicate that, in the actual flat coil obtained by projection, two or another even number of conductors are split and e.g., continue in opposite directions along an arc of circle until they meet the projection of another meridian along which they return. Likewise, when currents on the sphere arrive from two opposite directions on a meridian, and depart in two opposite directions on the equator, as illustrated in FIG. 40, they are split as indicated in FIG. 41, the double arrows having the same meaning as before.

The projected arcuate electroconductors for a particular harmonic are spaced radially from the z-axis at a pole face in a manner for providing that ancillary harmonics of the same order but of a lower and/or a higher degree have a negligible effect at a preselected point in the gap along the z-axis in the field. That preselected point is the center of the sphere which coincides with the sample position.

It will be noted that for reasons of symmetry, the order of the ancillary harmonic functions produced by an electroconductor which is arranged for producing a desired primary function is the same as, or, an odd multiple of, the order of the primary functions, and its degree is the same as, or, differs by an even number from, the degree of the primary function. Thus, it is possible for ancillary harmonic (3,0) and (5,0) functions, generated by the primary (1,0) electroconductor, to establish fields causing significant interference with the desired corrective fields generated by primary (3,0) and (5,0) electroconductors. In general, the desired spatial arrangement is established by determining the magnitude of interference for various radial spacings of the arcuate electroconductors and selecting a spacing providing tolerably low interference. The magnitudes of these ancillary components and the corresponding spacings are determined from the following analysis. The Biot-Savart law is simplified and written vectorially as follows to yield the elementary field $dH$ produced at a point P by a current unity passing in an element $ds$ of a conductor:

$$\vec{dH} = \frac{\vec{ds} \, x \vec{L}}{L^3}$$

where $x$ stands for vectorial product, L is the vector from $ds$ to P and L its absolute length.

The application of this formula to a current unity traveling c.c.w. in a circular loop of radius $r$ on the left pole when viewed from the +z direction yields for the field $H_z$ produced at the origin and neglecting at first the effect of the magnetic material of the pole faces:

$$H_z = -2\pi \frac{r^2}{(r^2+z^2)^{3/2}}$$

in which it must be understood that z is measured from the pole face, where we have $z=0$. (This must be contrasted with the fact that we have $z=0$ at the airgap center for all expressions representing spherical harmonics. No confusion need arise from this convenient convention.) The effect of the magnetic material can be adequately approximated when the pole faces are assumed to be infinitely extended and to have infinite permeability by placing image loops centered on the z-axis at the distances $z=1, z=3, z=5$, etc., from the gap center. These image loops are traversed by currents of the same intensity and flowing in the same direction as flows in the two loops on the two pole faces of the magnet. The successive field gradients in the z direction are similarly obtained by forming the successive derivates of $H_z$ with respect to z, from the expression above, and taking account of the images as indicated except for the factor two due to the image of the loop considered in the pole to which it is immediately adjacent is neglected, as well as another factor two due to the windings on the right pole face. The field written above and its successive derivatives are:

$$H_z = -2\pi \sum \frac{r^2}{(z^2+r^2)^{3/2}} \quad (5)$$
$$z=1, 3, 5,$$

$$H_z' = 6\pi \sum \frac{r^2 z}{(z^2+r^2)^{5/2}} \quad (6)$$
$$z=1, -3, 5, \ldots$$

$$H_z'' = -6\pi \sum \frac{r^2(4z^2-r^2)}{(z^2+r^2)^{7/2}} \quad (7)$$
$$z=1, 3, 5, \ldots$$

$$H_z''' = 30\pi \sum \frac{r^2 z(4z^2-3r^2)}{(z^2+r^2)^{9/2}} \quad (8)$$
$$z=1, -3, 5, \ldots$$

$$H_z'''' = -90\pi \sum \frac{r^2(8z^4-12z^2r^2+r^4)}{(z^2+r^2)^{11/2}}, \text{ etc.} \quad (9)$$
$$z=1, 3, 5$$

These expressions are employed in calculating the zonal harmonics, $n,0$, generated by the simple loops.

For reasons of symmetry, when the circular electroconductors at the two pole faces are traversed by equal currents having the same direction, they make no contribution to the first and third derivatives, $H_z'$ and $H_z'''$, but they do for currents traveling in opposite directions (while making none to $H_z$, $H_z''$ and $H_z''''$), hence the alternation of the signs of z in the $\Sigma$'s for $H_z'$ and $H_z'''$.

Values proportional to $H_z$, $H_z''$ and $H_z''''$ for different values of $r$ are calculated in accordance with equations (5), (7) and (9) and are tabulated in table II, and values proportional to $H_z'$ and $H_z'''$ are tabulated in table III.

TABLE II

| r | 1/4 | √2/4 | 1/2 | √2/2 | 1 | √2 | 2 |
|---|---|---|---|---|---|---|---|
| $\frac{1}{2\pi}H_z$ | .060 | .111 | .192 | .297 | .400 | .468 | .494 |
| $-\frac{1}{6\pi}H_z''$ | .200 | .323 | .433 | .424 | .277 | .104 | .020 |
| $\frac{1}{90\pi}H_z''''$ | .324 | .426 | .371 | .121 | −.066 | −.057 | −.014 |

From table II it is seen that both $H_z''$ and $H_z''''$ are relatively small when $r$ is greater than two. Thus relatively small ancillary harmonics (3,0) and (5,0) will be generated by the primary function (1,0) electroconductor when its radius is greater than two. For purposes of illustrating a specific example but not deemed limiting in any respect, a magnet with a 2 inch airgap, an electroconductor width of the order of 0.0075 inches, and an insulating space between electroconductors of the order of 0.005 inches is selected. With due regard to minimizing current amplitude requirements, then four generally circular arcuate segments having radii selected to be 2.10 inches; 2.14 inches; 2.18 inches; and 2.22 inches are formed. This electroconductor, having a differing scale for purposes of clarity in the drawings, is illustrated in FIG. 3 and the arcuate segments are indicated by the reference numerals 76, 78, 80 and 82 respectively. But henceforward the convention indicated earlier of making the distance from the airgap center to either pole face will be adhered to, and the several radii selected for several arcuate conductors will be shown as numbers.

The locus of electroconductors formed on an insulative sphere and adapted for generating (2,0); (3,0); (4,0); and (5,0) primary functions are illustrated in FIGS. 7, 11, 17 and 25 respectively.

Projection of the locus of these functions also results in circular electroconductor arrangements. Interference with the primary (1,0) and (5,0) functions by the ancillary functions of the (3,0) windings, is to be avoided as well as interference with the primary (1,0) and (3,0) functions by the ancillary function of the (5,0) winding.

Figure 12:
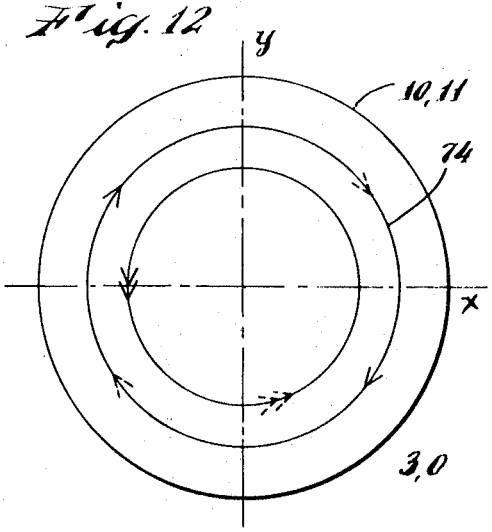
Figure 13:
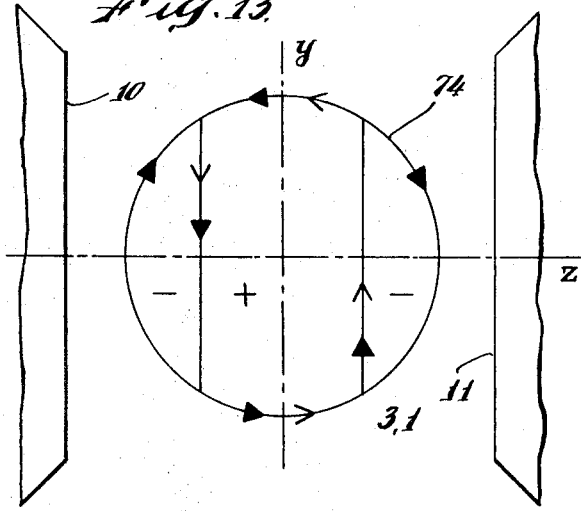
Figure 14:
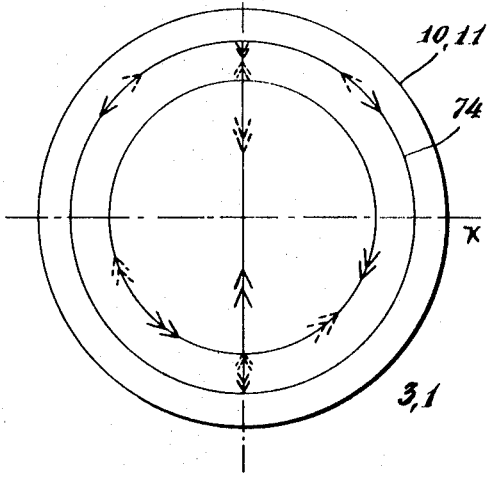
Figure 15:
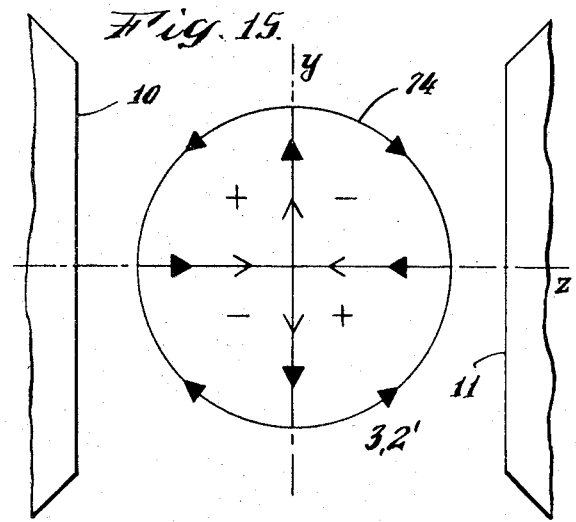
Figure 16:
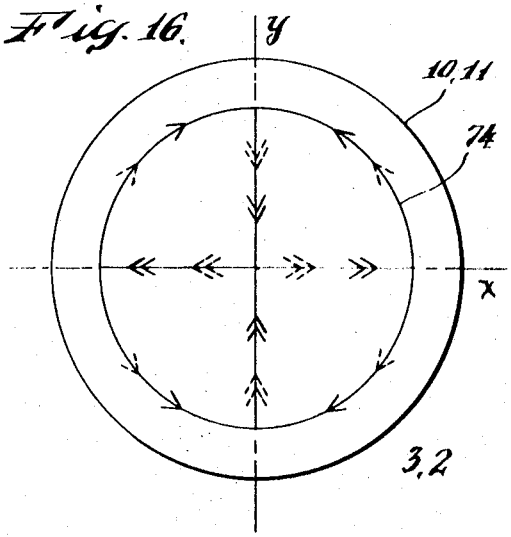

Anticipating the use of other electroconductors for other harmonic orders as indicated hereinafter, and in view of $H_z$ as calculated, the following positions are selected for the primary (3,0) function electroconductors:

a. for the electroconductors projected on pole face 10 and conducting clockwise flowing currents in FiG. 12, $r=0.78$, 0.82, 0.94 and 0.98; and having the average position $r=0.88$; and b. for the electroconductors projected on pole face 10 and conducting counterclockwise flowing currents in FIG. 12, $r=1.66$, 1.70 and 1.74; and having the average position $r=1.70$.

The interpolated values of $H_z$ at $r=0.88$ and 1.70 from table II are 0.38 and 0.49 respectively, values which when multiplied by four and three respectively, in order to reflect the respective number of loops near $r=0.88$ and $r=1.70$, and subtracted, give an adequately small residual for contamination of the primary (1,0) function by the ancillary (1,0) harmonic of the primary (3,0) function. Likewise, the interpolated values of $H_z''''$ at $r=0.88$ and 1.70 are −0.01 and −0.03, and those small and partially cancelling values indicate that the primary (5,0) function is also substantially free of (5,0) contamination from the primary (3,0) function.

The position of the primary (5,0) function loops were similarly determined as follows:

a. for the inner electroconductor projected on pole face 10 and carrying clockwise flowing current in FIG. 26, $r=0.34$ and 0.38; i.e., two loops at the average position $r=0.36$;

b. for the intermediate electroconductor projected on pole face 10 and carrying counterclockwise flowing current in FIG. 26, $r=0.86$ and 0.90; i.e., two loops at the average position $r=0.88$, and for the outer electroconductor projected on pole face 10 and carrying clockwise flowing current in FIG. 26, a single loop at $r=1.78$.

The interpolated $H_z$ contributions at the three average $r$ values just stated are 0.11; 0.36 and 0.49 which, when multiplied by (2); by (−2), and by (1) and added indicate a near arithmetic cancellation, so that the primary (5,0) function electroconductor placed as indicated above is substantially free of ancillary (1,0) which would contaminate the primary (1,0) function. The interpolated values of $H_z''$ at $r=0.36$; 0.88 and 1.78 are 0.33, 0.34 and 0.64 which, when multiplied by (2), by (−2) and by (1) and added give the small residual 0.02 which indicates that the primary (5,0) function is also substantially free of ancillary (3,0) which would contaminate the primary (3,0) function.

As illustrated in FIGS. 8 and 18, the primary (2,0) function and primary (4,0) function electroconductors conduct current in opposite directions on the two pole faces 10 and 11 and their radial spacing is calculated from the alternating series (6) and (8), for which the following values are computed:

TABLE III

| r | $\sqrt{2}/4$ | 1/2 | $\sqrt{2}/2$ | 1 | 2¼ | $\sqrt{2}$ | 2 |
|---|---|---|---|---|---|---|---|
| $\frac{1}{6\pi}H_z'$ | .092 | .140 | .176 | .168 | .146 | .113 | .056 |
| $\frac{1}{30\pi}H_z'''$ | .267 | .296 | .200 | .041 | −.010 | −.032 | −.020 |

For the primary (2,0) function and with due regard to reducing the current amplitude required, three loops are selected at $r=1.10$; 1.14 and 1.18, i.e., at an average value of $r=1.14$ for which value of $r$, $H_z'''$ is negligibly small as interpolation indicates.

Similarly, for the primary (4,0) function, two clockwise loops are selected at $r=0.42$ and 1.46, and two counterclockwise loops at $r=1.38$ and 1.42. It is seen from the calculated values of table III that $H_z'$ interpolated at the average positions =0.44 and 1.40 is 0.12 and 0.115 respectively, indicating here, also, the near freedom of the (4,0) windings from (2,0) contamination. The electroconductors for generating the zonal functions (1,0), (2,0), (3,0) and (5,0) are illustrated in FIG. 3, and the electroconductor for generating the zonal function (4,0) is located on the second of the two pairs of plates mentioned earlier, and is illustrated in FIG. 4.

The electroconductors for the order $m=1$ are formed, as described in detail hereinafter, by the superposition of semicircles. A semicircle 200 as shown in FIG. 27 is positioned at both pole faces 10 and 11, and is paired with a second semicircle symmetric with respect to the z-axis and traversed by current in a direction opposite to the direction of current in the first semicircle in a manner for providing that the contribution of the two paired semicircles to the field $H_z$ will cancel, while their contributions to the field $H_y$ will add.

A primary (1,1)' function electroconductor, although not one of the 17 primary functions being generated, would produce the potential:

$$0 = y \qquad (15)$$

the derivative of which with respect to $y$ is unity, and the derivatives, $Hy'$, $Hy''$ and $Hy'''$ of the potential actually produced by a (1,1)' winding will be measures of the (2,1)', (3,1)' and (4,1)' functions which it may be desired to produce, or not to produce, by several of the electroconductors intended to produce harmonics of first order ($m=1$).

An expression for $H_y$ can be derived by applying the Biot-Savart law to obtain the contributions to $H_y$ of the radial segment 202 and curved segment 204 of the semicircular electroconductor illustrated in FIG. 27.

The contribution $H_{yr}$ of the radial segment 202 is proportional to the integral:

$$H_{yr} = -\int_{-r}^{r} \frac{z\,dx}{(z^2+r^2)^{3/2}} = -\frac{2r}{(z^2+r^2)^{1/2}} \qquad (16)$$

The contribution $H_{yc}$ of the curved segment 204 is proportional to the integral:

$$H_{yc} = \int_{0}^{\pi} \frac{zr \sin d}{(z^2+r^2)^{3/2}} = \frac{2z_0 r}{(z^2+r^2)^{3/2}} \qquad (17)$$

The $H_y$ field produced by a semicircular electroconductor 200 and by the other obtained by imaging with respect to the $xz$ plane, is then given by the expression:

$$H_y = H_{yr} + H_{yc} = -4 \cdot \frac{r^3}{z(z^2+r^2)^{3/2}} \qquad (18)$$

When the images of these electroconductors in pole pieces of assumedly infinite permeability are taken into account, the following are useful quantities for determining the electroconductors for producing harmonic functions of the first order in the $y$ or $x$ direction, where the superscript prime symbol again designates differentiation with respect to $z$:

$$(2,1)H_y' = 4 \sum_{z=1,3,5} \frac{r^3(4z^2+r^2)}{z^2(z^2+r^2)^{5/2}} \qquad (19)$$

$$(4,1)H_y''' = 12 \sum_{z=1,3,5} \frac{r^3(40z^6+12z^4r^2+9z^2r^4+2r^6)}{z^4(z^2+r^2)^{9/2}} \qquad (20)$$

one-fourth of $H'$ and one-twelfth of $H'''$ (also designated hereinafter as A) are calculated for various values of $r$ as indicated in table IV:

TABLE

| r | 1/2 = | 2/2 | 1 | 2 | 2 | ∞ |
|---|---|---|---|---|---|---|
| 1/40 $H_y'$ = | 0.306 | 0.582 | 0.898 | 1.112 | 1.213 | 1.234 |
| 2A= 1/12$H_y'''$ = | 1.999 | 2.769 | 2.795 | 2.365 | 2.092 | 2.030 |

Table IV will be utilized to establish primary (2,1) function electroconductors with reduced interference from their ancillary (4,1) function with the primary (4,1) function and for establishing primary (4,1) function electroconductors with reduced interference from their ancillary (2,1) function with the primary (2,1) function.

Figure 29:
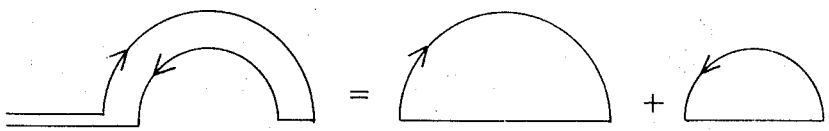
FIG. 29 is a diagram illustrating the resolution of the electroconductor of FIG. 28 into separate semicircular components.

It is noted that all but the zonal harmonic electroconductors require windings with segments extending through the z-axis. Since the aforementioned plate configuration will accommodate conveniently only four straight segments, i.e., two side by side, on each of the two sides of the plate, circumferential detours are provided in order to avoid the extension of a straight segment through the center. These detours will be arranged to avoid certain contaminations. A typical detour will be made for the primary (2,1) function electroconductor, one-half of which is illustrated by FIG. 28, the other half being symmetric with respect to the horizontal line. FIG. 29 illustrates that the actual (2,1) electroconductor selected can be considered as the combination of two of the single windings for which $H_y'''$ has already been calculated above. This arrangement will be utilized generally to avoid several contaminations.

Figure 30:
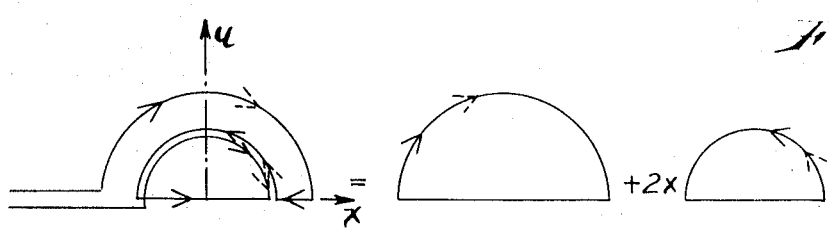
FIG. 30 is a diagram illustrating the semicircular arrangement of a portion of an electroconductor for generating a spherical harmonic function of order $m=1$ and the resolutions thereof into separate semicircular components.
Figure 32:
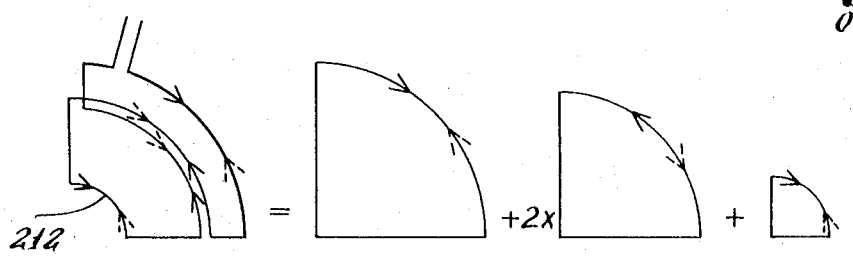
FIG. 32 is a diagram of a portion of an electroconductor for generating a spherical harmonic function of order and illustrates the quarter circular configuration of arcuate electroconductor segments and their resolution into separate "-building blocks;"

It will be noted also that the physical necessity of providing several current paths which are parallel to each other in the radial directions has demanded that the semicircular or sectorial building blocks illustrated in FIGS. 29, 30, and 32 out of which all windings are formed be made somewhat smaller, with their straight portion displaced towards their centers, while the circular portions are still centered on the z-axis. It has been verified by actual calculations that in all the examples shown here the effect of these departures from the ideal configuration is to decrease the fields produced by a few percents only, and since the ratios of these fields, which are of primary concern, are affected by the differences between these few percents, this effect has not been taken into account in the calculations shown below, but could indeed be reckoned with if extreme mathematical precision were required in the designs.

In the case of the primary (2,1) function electroconductor, shown in FIG. 4, the interpolated values of $H_y'''$ at $r=0.54$ and $r=0.58$ are 2.20, and 2.37 respectively, and the interpolated values of $H_y'''$ at $r=1.34$ and $r=1.70$ are 2.42 and 2.15 respectively, and since there are four semicircular electroconductors at the first two radii given above, and four semicircular electroconductors with the opposite direction at the last two radii given above, it is seen that, because we have: $2.20+2.37=2.42+2.15$, we have an excellent cancellation of the unwanted ancillary (4,1) function, hence the selection of the radii given above for the arcuate segments of the (2,1) electroconductor. Likewise, the radii of the (2,1)' function selected were 0.50 and 0.62 for one direction, for which radii $H_y'''$ has the respective values 2.00 and 2.51 respectively, and 1.46 and 1.58 for the other direction, at which latter radii $H_y'''$ has the respective values 2.31 and 2.20. Since we have: $2.00+2.51=2.31+2.20$, it is seen that the cancellation of the unwanted (4,1)' harmonic for the (2,1)' electroconductor is also excellent.

The freedom of (2,1)' contamination of the field generated by the primary (4,1)' function electroconductor is likewise effected. FIG. 30 indicates that the primary (4,1)' function can be composed of several semicircles. At the $r=0.68$, and 1.34 positions, the interpolated values of $H_y'$ for the ancillary (2,1)' function are 0.55 and 0.09 which, when multiplied by (2) and by (−1) respectively, and added substantially cancel. Accordingly, the primary (4,1)' function electroconductor is assigned the midconductor radii $r=0.62$, 0.74 and 1.34. The two center positions for the double electroconductor shown running counterclockwise on FIG. 30 have the average value 0.68 indicated above, and are spaced apart to make room for the primary (4,1) function electroconductor. The latter electroconductor was assigned the radii $r=0.66$, 0.70, which have the average value $r=0.68$, and 1.30, for which the interpolated values of $H_y'$ are: 0.55 and 1.08 which, when multiplied by (2) and by (−1), and added, substantially cancel.

Since the ancillary (1,1)' and (3,3)' harmonic functions also generated by the (3,1)' winding are perpendicular to the main field, they are of negligible importance. The three (3,1)' semicircular segments were assigned the radii 0.90, 1.02, and 1.82. Similarly, the (3,1) function electroconductor was assigned the midconductor positions $r=0.94, 0.98$ and 1.78.

For the (4,2)' electroconductor the following radii were selected: $r_1=0.34$, $r_2=1.12$ and $r_3=2.22$. As it is, it can be calculated that little contamination of the (2,2)' harmonic is present, but this is of little importance as the corresponding magnetic vector is perpendicular to the main field. Similarly, the following radii were selected for the (4,2) winding: $r_1=0.38$, $r_2=1.12$ and $r_3=2.18$ for which there is also little (2,2) contamination.

No avoidance of contamination is sought for the primary (3,2), (3,2)', (4,3) and (4,3)' function electroconductors. The contamination produced by these windings are of a higher degree and are considered negligible. The following midconductor loop positions were assigned to the projection of these electroconductors:

(3,2)'   $r=0.22$ and 1.22
(3,2)    $r=0.26$ and 1.26
(4,3)'   $r=0.18, 0.30, 1.02$ and 1.26
(4,3)    $r=0.22, 0.26, 1.06$ and 1.22

Figure 34:
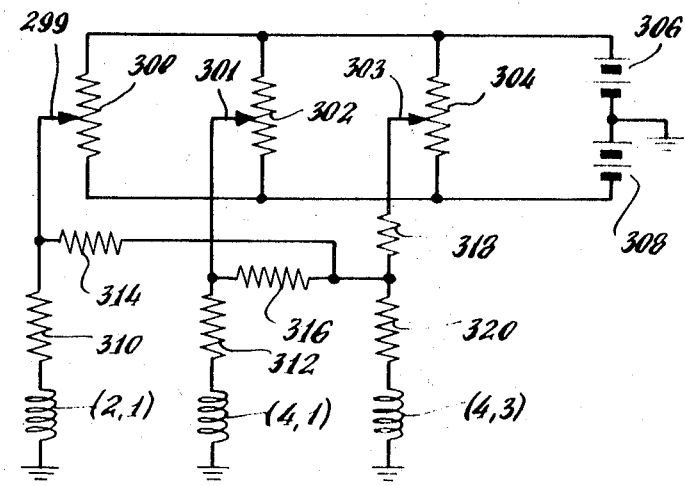
FIG. 34 is a diagram illustrating a circuit for cancelling ancillary harmonics not cancelled by spacing of arcuate coil segments.

It is necessary, however, to avoid contamination of the (4,3) winding by the (2,1) and (4,1) windings on the one hand and of the (4,3)' winding by the (2,1)' and (4,1)' on the other hand. This is accomplished in accordance with a feature of this invention by a network means illustrated in FIG. 34. In FIG. 34 the potentiometers 300, 302 and 304 are of negligibly small impedance. An arm 299 of the potentiometer 300 is adjusted to control the current amplitude in the (2,1) winding. This current is not affected by the adjustment of the potentiometers 302 and 304. Similarly, an arm 301 of potentiometer 302 controls the current in the (4,1) winding without contamination by the other currents. An arm 303 of potentiometer 304 controls the current in the (4,3) winding. However, in the latter case the current in the (4,3) winding is also affected, through resistances 314 and 316, by the settings of the arms of potentiometers 300 and 302 respectively. The order of the winding corrections are calculated in a manner for providing that the physical contamination of the (4,3) field by the (2,1) or (4,1) windings is substantially correct. The determination of this combination proceeds as follows. The simple semicircular loop of FIG. 27, traversed by current unit, together with the semicircle symmetric with it with respect to the $xz$ plane and the other two semicircles symmetric with these with respect to the $xy$ plane produce some (4,1)' and (4,3)' spherical harmonics which can be written with generality as:

$$\Phi = A(4,2)' + B(4,3)' \quad (21)$$
$$= Ayz[4z^2-3(x^2+y^2)] + Byz(3x^2-y^2) \quad (22)$$

The Biot-Savart law, simplified as indicated earlier, is utilized for the determination of the $H_y$ vector produced by the semicircle of FIG. 27 and the result is multiplied by two to account for the contribution of the other semicircular loop. For unit current, and inclusion of the images of the current loops in the pole faces, we have:

$$\frac{\partial^4 \phi}{\partial^2 x \partial y \partial z} = \frac{\partial^3 H_y}{\partial x^2 \partial z}$$

$$= 2 \sum_{z=1,3,5,\ldots} \frac{-60z^6 r^3 + 10z^4 r^5}{z^4(z^2+r^2)^{9/2}} = -6A + 6B \quad (23)$$

and, as tabulated hereinbefore in Table IV $$\frac{\partial^4 \phi}{\partial y \partial z^3} = \frac{\partial^3 H_y}{\partial z^3}$$

$$= 2 \sum_{z=1,3,5\ldots} \frac{240z^6 r^3 + 72z^4 r^5 + 54z^2 r^7 + 12r^9}{z^4(z^2+r^2)} = 24A \quad (24)$$

from which $$2B = \frac{1}{3}\frac{\partial^4\phi}{\partial x^2\partial y\partial z} + \frac{1}{12}\frac{\partial^4\phi}{\partial y\partial z^3} = \frac{1}{3}\frac{\partial^3 H_y}{\partial x^2\partial z}$$

$$+ \frac{1}{12}\frac{\partial^3 H_y}{\partial z^3} = \sum_{z=1,3,5\ldots}\frac{\frac{56}{3}z^4r^5 + 9z^2r^7 + 2r^9}{z^4(z^2+r^2)^{9/2}}$$

(25)

which is calculated for several values of $r$ in table V.

TABLE V

| $r$ | $\sqrt{1/2}$ | $1/2$ | $\sqrt{3/2}$ | 1 | $\sqrt{2}$ | $\infty$ |
|---|---|---|---|---|---|---|
| $2B$ | .06 | .23 | .67 | 1.31 | 1.80 | 2.03 |

Figure 33:
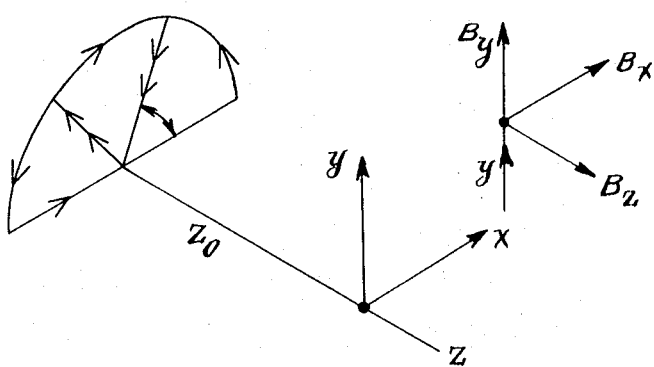
FIG. 33 is a diagram of a portion of an electroconductor for generating a spherical harmonic of degree $n=4$ and order $m=3$.

Likewise the application of the Biot-Savart law for the winding of FIG. 33, where the double arrows denote double current, gives for that winding and the other one obtained by imaging in the $xz$ plane, and including the images in the pole faces:

$$\frac{\partial^4\phi^*}{\partial x^2\partial y\partial z} = \sum_{z=1,3,5\ldots} = \sum_{z=1,3,5}\frac{168z^4r^5 + 81z^2r^7 + 18r^9}{z^4(z^2+r^2)^{9/2}} = 18B$$

(26)

where the asterisk (*) is utilized to denote the circumstance that the calculations are carried out with respect to the windings of FIG. 33 (as against the simple semicircular winding used earlier), and where it will be noted that the value obtained is three times the contribution to 6B obtained in (23) for the simple semicircle of FIG. 27 and its images, and written for 2B in (25). This corresponds neatly to the fact that, taking the semicircle of FIG. 27 and its images, plus this ensemble rotated at 120° around the $z$-axis, reproduces exactly the configuration of FIG. 33 and its images.

From this it is possible to interpolate from table V and calculate the contamination of the (4,3) and the (4,3)′ windings by the ancillary functions produced by the (2,1) and (4,1) primary functions, on the one hand, and by the (2,1)′ and (4,3) on the other hand; to divide by three and compare with the (4,3) and (4,3)′ interpolated B values; and to determine suitable magnitudes of the resistances 310 through 320 of FIG. 34 as well as the proper current directions so as to correct for contaminations. The kind of calculations involved here will be illustrated below in greater detail in connection with the more complex networks required for field homogenization when the NMR sample is spun.

The foregoing described the generation of orthogonal, current-traversed windings for the purpose of cancelling the inhomogenities of a magnetic field in which an NMR fixed sample is studied.

Figure 35:
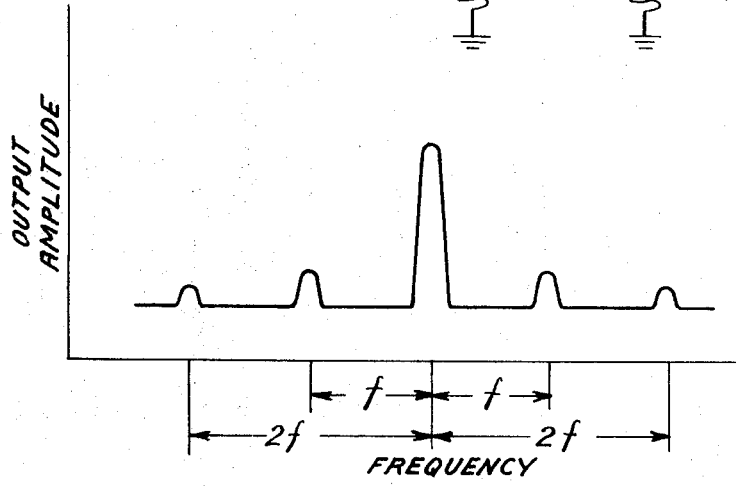
FIG. 35 is a diagram illustrating a portion of a spectrogram generated by a NMR apparatus when a sample under investigation is subjected to spinning.

When the sample is spun, e.g., around the $y$-axis, the $H_z$ field for any one nucleus is averaged along a circle centered on the $y$-axis and in a plane normal to it and the central absorption line of a generated spectrogram will be sharpened correspondingly. The only remaining inhomogeneities acting on this line are those which are due to the variation of the field average with $y$, and which can be expressed as spherical harmonics written as functions of $y$ and of $x^2+z^2$ such as $y$, $2y^2-(x^2+z^2)$, $2y^3-3x(x^2+z^2)$, etc. On the other hand there will be in addition to the main central line, frequency modulation sidebands spaced from it by the rotational frequency $f$ of the sample and multiples thereof. A spectrogram of this type is illustrated in FIG. 35. For example, there will exist at the frequency interval $f$ at $f$ sides of the central line, sidebands due to inhomogeneities proportional to $x$ or $z$ such as those for which the field $zz$ can be written $x$, $xy$, $x[4y^2-(x^2+z^2)]$, etc., or again, $z$, $yz$, $z]4y^2-(x^2+z^2)]$, etc. Similarly, there will be at a distance $2f$ on either side of the central line, sidebands due to inhomogeneities of $H_z$ which can be written $(x^2-z^2)$, $Y(x^2-z^2)$, etc., or $xz$, $xyz$, etc., and so forth for higher frequencies.

Most of the magnetic potentials which, when differentiated with respect to $z$, produce the expressions written above are not the spherical harmonics listed in table I but are linear combinations of those spherical harmonics. If the windings described hereinbefore for homogenizing the magnetic field for a stationary sample are retained, with their individual current-adjusting controls, the operation of one such control affects simultaneously the amplitude of the central line and sidebands of FIG. 35, or several sidebands, while the central line amplitude is affected by several windings acting redundantly with respect to each other.

In order to restore orthogonality of settings, it is necessary to express the harmonic functions of degree $n$ higher than two, from which the expressions written above are obtained by differentiation with respect to $z$, as linear combinations of the spherical harmonic functions referred to the polar $z$-axis. For this purpose, table VI has been formed for each degree of the spherical harmonics starting at the second and including it for the sake of completeness. The first column, entitled frequency, indicates whether that harmonic of interest which represents an inhomogenity affects the central line (C) of the spectrogram or a sideband spaced $f$, $2f$, etc., from a central line. All the $f$'s are paired corresponding to quantities proportional to the cosines ($x$, $(x^2-z^2)$, etc.) or the sines ($z$, $xz$, etc.) of once, twice, etc., the angle measured from the $x$-axis, as a line starting on the $x$-axis rotates in the $x$–$z$ plane around the $y$-axis.

| Freq. | Hz | Magn. pot. | Decomposition | Symbols |
|---|---|---|---|---|
| | | | Second degree | |
| C | $y$ | $yz$ | $yz$ | |
| f | $x$ | $xz$ | $xz$ | (2, 1)′ |
| f′ | $z$ | $2z^2-(x^2+y^2)$ | $2z^2-(x^2+y^2)$ | (2, 1) |
| | | | | (2, 0) |
| | | | Third degree | |
| C | $2y^2-(x^2+z^2)$ | $z^3-3z(2y^2-x^2)$ | $\frac{1}{2}z[2z^2-3(x^2+y^2)]+\frac{3}{2}z(x^2-y^2)$ | $\frac{1}{2}(3,0)+\frac{3}{2}(3,2)$ |
| f | $xy$ | $xyz$ | $xyz$ | (3, 2)′ |
| f′ | $yz$ | $y[4z^2-(x^2+y^2)]$ | $y[4z^2-(x^2+y^2)]$ | (3, 1)′ |
| 2f | $x^2-z^2$ | $z^3-3zx^2$ | $\frac{1}{2}z[2z^2-3(x^2+y^2)]-\frac{3}{2}z(x^2-y^2)$ | $\frac{1}{2}(3,0)-\frac{3}{2}(3,2)$ |
| 2f′ | $xz$ | $x[4z^2-(x^2+y^2)]$ | $x[4z^2-(x^2+y^2)]$ | (3, 1) |
| | | | Fourth degree | |
| C | $2y^3-3y(x^2+z^2)$ | $yz^3+3yzx^2-2y^3z$ | $\frac{1}{4}yz[4z^2-3(x^2+y^2)]+\frac{5}{4}yz(3x^2-y^2)$ | $\frac{1}{4}(4,1)'+\frac{5}{4}(4,3)$ |
| f | $x[4y^2-(x^2+z^2)]$ | $xz^3+3x^3z-12xy^2z$ | $\frac{1}{4}xz[4z^2-3(x^2+y^2)]+\frac{15}{4}xz(x^2-3y^2)$ | $\frac{1}{4}(4,1)+\frac{15}{4}(4,3)$ |
| f′ | $z[4y^2-(x^2+z^2)]$ | $z^4+2z^2x^2-8z^2y^2-1\frac{1}{24}x^4+\frac{3}{4}x^2y^2+\frac{29}{24}y^4$ | $\frac{1}{8}[8z^4-24z^2(x^2+y^2)+3(x^2+y^2)^2+\frac{5}{6}(x^2-y^2)[6z^2-(x^2+y^2)]]$ | $\frac{1}{8}(4,0)+\frac{5}{6}(4,2)$ |
| 2f | $y(x^2-z^2)$ | $yz^3-3x^2yz$ | $\frac{1}{4}yz[4z^2-3(x^2+y^2)]-\frac{3}{4}yz(3x^2-y^2)$ | $\frac{1}{4}(4,1)'-\frac{3}{4}(4,3)$ |
| 2f′ | $xyz$ | $6z^2xy-x^3y-xy^3$ | $xy[6z^2-(x^2+y^2)]$ | (4, 2)′ |
| 3f | $z^3-3xz^2$ | $z^3x-zx^3$ | $\frac{1}{4}xz[4z^2-3(x^2+y^2)]-\frac{5}{4}xz(x^2-3y^2)$ | $\frac{1}{4}(4,1)-\frac{5}{4}(4,3)$ |
| 3f′ | $3x^2z-z^3$ | $z^4-6z^2x^2+\frac{7}{8}x^4-\frac{1}{8}y^4+\frac{3}{4}x^2y^2$ | $\frac{1}{8}[8z^4-24z^2(x^2+y^2)+3(x^2+y^2)-\frac{1}{2}(x^2-y^2)[6z^2-(x^2+y^2)]]$ | $\frac{1}{8}(4,0)-\frac{1}{2}(4,2)$ |

The second column, entitled $H_z$, contains the expressions for $H_z$ which corresponds to $Cf$ and $f$, etc., for the ascending degrees. The third column indicates the form of the magnetic potentials from which $H_z$ can be derived and in which the terms not containing $z$ have been so selected that these potentials can be expressed in terms of the zonal and tesseral harmonics with the polar $z$-axis only, i.e., without sectorial harmonics, as this can be gathered from the forth column. The fifth column contains the shorthand expressions for the fourth column in accordance with table I.

It will be noted from column five of table VI that several spherical harmonics occur singly and only once, and, therefore, need not be hybridized. It will be further noted that several occur in pairs, and in each instance twice. Two pairs, namely (3,0) and (3,2), and (4,0) and (4,2) can be simply hybridized. Since each pair occurs once as a sum and once as a difference of two harmonics, the hybridization can be effected by means of a circuit such as the one shown in FIG. 36, while the relatively more complicated circuit of FIG. 37 provides for the hybridization of (4,1) and (4,3), on the one hand, and the hybridization of (4,1)' and (4,3)' on the other, because of the respective contamination of the (2,1) and (2,1)' winding.

Figure 31:
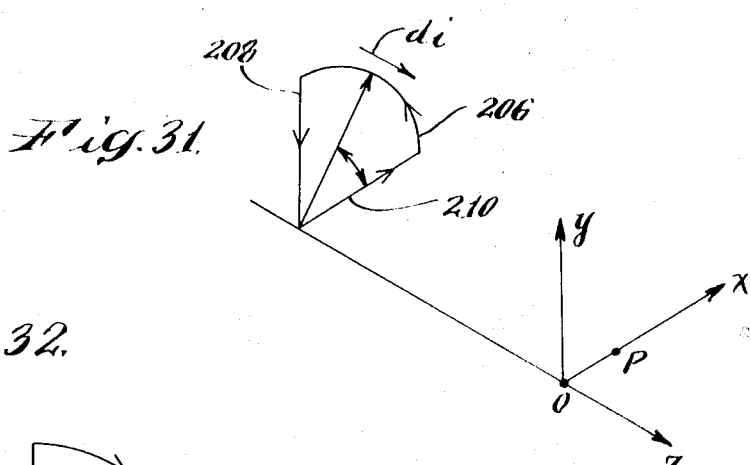
FIG. 31 is another diagram utilized for determining the magnitude of ancillary interfering harmonic functions.

Referring now more particularly to the (3,0) and (3,2) harmonics, column five of table VI indicates that their relative values should be in a 1:9 ratio in one case, and in a −1:3 ratio in another. However, in order to obtain the current ratios, additional weighting factors must be introduced in accordance with the values of $H_z''$ of table II for the (3,0) harmonic, and in accordance with the values of $$\frac{\partial^2 H_z}{\partial xz}$$

which are obtained, in turn, from the values of $$\frac{\partial^2 Hy}{\partial x \, \partial z}$$

computed for the quarter loop of FIG. 31, and for the other similar three quarter loops obtained by imaging with respect to the $x$- and $y$-axii. These values are yielded by an application of the Biot-Savart law and are:

$$\frac{\partial^2 Hy}{\partial x \, \partial z} = 4 \sum_{z=1,3,5...} \left( \frac{2}{z^3} - \frac{2z^4 + 7z^2 r^2 - 5/2 r^4}{(z^2 + r^2)^{7/2}} \right) \quad (27)$$

Several values of the bracketed term (27) are tabulated in table VII.

TABLE VII

| $r$ | $\sqrt{¾}$ | ½ | $\sqrt{¾}$ | 1 | $\sqrt{2}$ | 2 | ∞ |
|---|---|---|---|---|---|---|---|
| $\frac{\partial_2 Hy}{\partial x \, \partial z}$ | +.12 | +.35 | +.82 | 1.43 | 1.89 | +2.06 | +2.11 |

Let now the harmonic required for the correction of the third degree harmonic which affects the central line or the $2f$ sideband be written:

$$\Phi = \alpha i(3,0) \cdot (3,0) + i(3,2) \cdot (3,2) \quad (28)$$

where $i(3,0)$ and $i(3,2)$ designate the currents circulating in the (3,0) and (3,2) loops respectively and $\alpha$ and $\beta$ coefficients to be determined.

We have, for current unity in the (3,0) loops $$\frac{\partial^3 \alpha(3,0)}{\partial z^3} = 12\alpha = \sum H_z'' \quad (29)$$

where the sum extends over all the loops allotted to the (3,0) winding. The $H_z''$ s are obtained from table II and the equation above determines $\alpha$ as indicated in the calculations which follow in which the direction of the current in the various loops was selected so as to make $\alpha$ and $\beta$ positive. The same device has been utilized in all similar calculations below for the other networks.

$(3,0) r=$ values $\quad \frac{1}{6\pi} \sum H_z'' =$ values

|  | $r$ | values |
|---|---|---|
| c.w. loops | 0.78 | +0.40 |
|  | 0.82 | +0.38 |
|  | 0.94 | +0.31 |
|  | 0.98 | +0.29 |
| c.c.w. loops | 1.66 | −0.05 |
|  | 1.70 | −0.05 |
|  | 1.74 | −0.05 |
| TOTAL |  | +1.23 | whence: $\quad 12\alpha = +6(1.23)$
and: $\quad \alpha = +1.93$

We have also for the loop of FIG. 31 and its three images, when rotated 45° clockwise around the $z$-axis when viewed from $+z$:

$$\frac{\partial^3 \beta(3,2)}{\partial z \partial x^2} = 2\beta \quad (30)$$

and since the loop so rotated and traversed with current unity produces the potential $\beta z(x^2 - y^2)$, before rotation it produces $2\beta xyz$, from which we obtain:

$$\frac{\partial^3 (2\beta xyz)}{\partial x \partial y \partial z} = 2\beta = \frac{\partial^2 Hy}{\partial x \, \partial z} \quad (31)$$

where the summation extends over all the loops allotted to the (3,2) winding, the $$\frac{\partial^2 Hy's}{\partial x \partial x}$$

being obtained from table VII. This determines $\beta$ as indicated below:

$(3,2) r=$ values $\quad \frac{1}{4} \sum \frac{\partial^2 Hy}{\partial x \partial z} =$ values

|  | $r$ | values |
|---|---|---|
| c.c.w. loop | 1.26 | 1.85 |
| c.w. loop | 0.26 | −0.05 |
| TOTAL |  | 1.80 | whence: $\quad 2\beta = 4(1.80)$
and $\quad \beta = 3.60$

From table VI, last column and C and $2f$ lines of the third degree tabulation, we obtain:

$$\frac{\alpha i(3.0)}{\beta i(3.2)} = \begin{cases} 1/9 \text{ for } (c) \text{ control} \\ -1/3 \text{ for } (2f) \text{ control} \end{cases}$$

or, since $\alpha/\beta = +1.93/3.60 = +0.536$ $$\frac{i(3.0)}{i(3.2)} = \begin{cases} +.207 \text{ for } (c) \text{ control} \\ -.62 \text{ for } (2f) \text{ control} \end{cases}$$

Figure 36:
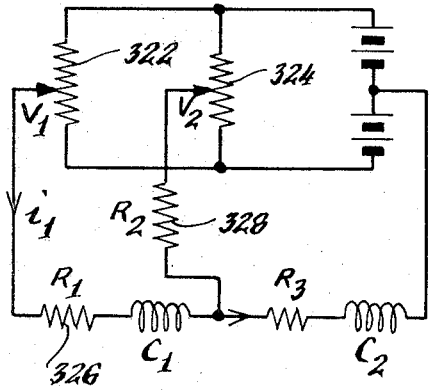
FIG. 36 is a diagram of a circuit arrangement adapted for combining currents, which generate harmonic functions, in a manner for providing desired field-corrective functions for a spinning sample.
Figure 37:
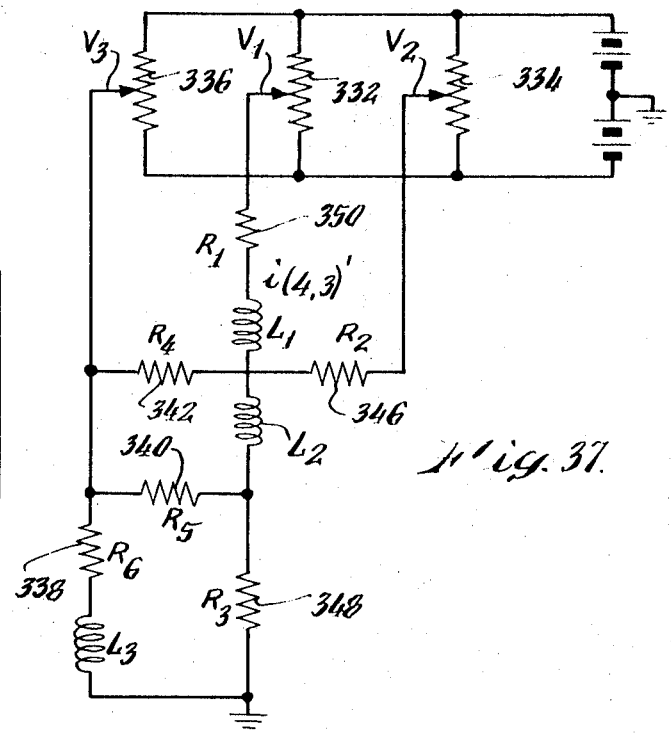
FIG. 37 is a diagram of a circuit arrangement adapted for combining currents, which generate harmonic functions, in a manner for providing additional desired field-correcting functions for a spinning sample.

The T-network of FIG. 36 provides adequately for these controls, provided the $C_1$ coil is made the (3.2) coil and the $C_2$ coil is made the (3.0) coil so that, when $V_1$ is, e.g., positive, the current flows in the loops of (3.0) and of 3.2 as indicated in the tabulated calculations above and provided also the $V_1$ control be assigned to (C) and the $V_2$ control to $(2f)$. Then, when the (C) control is operated, incremental $+\Delta i(3.0)$ and $\Delta i(3.2)$ values should be in the ratio:

$$\frac{+\Delta i(3.0)}{\Delta i(3.2)} = \frac{R_3}{R_2 + R_3} = .207$$

wherefrom $R_2 = 0.26 R_3$ and when the $(2f)$ control is operated, we should have:

$$\Delta i(3.0)/\Delta i(3.2) = R_1/R_3 = 0.62$$
$$\text{or: } R_1 = 0.62 R_3$$

In what precedes, as well as in what follows, the coil and potentiometer resistances are lumped with the additional resistances required. One skilled in the art will choose potentiometers of adequately small resistance, and convenient values for $R_1$, $R_2$, and $R_3$, possibly eliminating $R_1$ or $R_3$ and letting the resistance of the coil left alone in the arm of the T-network concerned determine the resistances of the other arms.

Referring now to the (4,0) and (4,2) harmonics, column five of table VI indicates that they should exist in the ratio 3:20 in one case and −1:4 in the other. In a similar manner, the current ratios are obtained by weighting the ratios just stated by the tabulated magnitudes of these harmonics for current unity.

Table III gives the values of $H_z'''$ for a single loop on one pole face and an expression for $$\frac{\partial^3 H_y}{\partial x \partial z^2}$$

for four quarter loops is obtained by differentiating the expression given above for $$\frac{\partial^2 H_y}{\partial x \partial z}$$

and is:

$$\frac{\partial^3 H_y}{\partial x \partial z^2} = 4 \sum_{z=1,3,5\ldots} \left[ -\frac{6}{z^4} + \frac{+6z^5 + 27z^3 r^2 - 63/2 z r^4}{(z^2 + r^2)^{9/2}} \right] \quad (34)$$

Several values of the bracketed term are tabulated in table VIII:

TABLE VIII

| r | ¼ | √2/4 | ½ | √2/2 | 1 | √2 | 2 | ∞ |
|---|---|---|---|---|---|---|---|---|
| ¼ $\frac{\partial^3 H_y}{\partial x \partial z^2}$ | −.24 | −.78 | −2.05 | −4.12 | −5.93 | −6.45 | −6.23 | −5.94 |

Let now the harmonic required for the correction of the $f'$ or $3f'$ fourth degree inhomogenity be written:

$$\Phi = \alpha_1 i(4,0) \cdot (4,0) + \beta_1 i(4,2) \cdot (4,2) \quad (35)$$

where $i(4,0)$ and $i(4,2)$ are the currents circulating in the (4,0) and (4,2) windings respectively. We have:

$$\frac{\partial^4 \alpha_1(4,0)}{\partial x^4} = 192 \alpha_1 = \sum H_z''' \quad (36)$$

where the summation extends over all the loops allotted to the (4,0) harmonic. This relation determines $\alpha_1$ as indicated below.

(4,0)r—values   $\frac{1}{30\pi} \sum H_z'''$—values

| c.c.w. loops | { 0.40 | 0.294 |
| | 0.46 | 0.300 |
| c.w. loops | { 1.38 | −(−0.030) |
| | 1.42 | −(−0.032) |
| TOTAL | | 0.656 | whence $192\beta_1 = 30\pi \cdot (0.656)$
and $\alpha_1 = 0.322$

We have also for the loop of FIG. 31 and its three images, when rotated 45° clockwise around the z-axis when viewed from +z:

$$\frac{\partial^4 \beta_1(4,2)}{\partial x^2 \partial z^2} = 24\beta_1 \quad (37)$$

Since the loop so rotated and traversed with unity current will produce the potential $\beta_1(x^2-y^2)[6z^2-(x^2+y^2)]$, before rotation it produces the potential $2\beta_1 xy[6z^2-(x^2+y^2)]$, from which we obtain:

$$\frac{\partial^4 2\beta_1 xy[6z^2-(x^2+y^2)]}{\partial x \partial y \partial z^2} = 24\beta_1 = \frac{\partial^3 H_y}{\partial x \partial z^2} \quad (38)$$

where the sum extends to all the loops allotted the (4,2) harmonic. This determines $\beta_1$ as indicated below:

(4,2)r—values   $\frac{1}{4} \frac{\partial^3 H_y}{\partial x \partial z^2}$ = values

| c.c.w. loop | 0.38 | −1.0 |
| c.w. loops | { 1.10 | −(−6.2) |
| | 1.14 | −(−6.3) |
| TOTAL | 2.18 | −6.1 |
| | | 5.4 | whence $24\beta_1 = 4 \cdot (5.4)$
and $\beta_1 = 0.90$

From table VI, last column, and $f'$ and $3f'$ lines of the fourth degree tabulation, we obtain:

$$\frac{\alpha_1 i(4,0)}{\beta_1 i(4,2)} = \begin{cases} \frac{3}{20} \text{ for } f \text{ control} \\ -\frac{1}{4} \text{ for } 3f \text{ control} \end{cases}$$

or, since $\alpha_1/\beta_1 = 0.322/0.90 = 0.358$ $i(4.0)/i(4.2) =$ for $f$ control
$-0.70$ for $3f$ control The T-network of FIG. 36 provides adequately for these controls, provided the $C_1$ and $C_2$ coils are made the (4,2) and (4,0) coils respectively, while $V_1$ and $V_2$ become the $f$ and $3f$ controls.

When the $f$ control is operated, incremental $\Delta i(4.0)$ and $\Delta i(4.2)$ values should be in the ratio:

$$\frac{\Delta i(4.0)}{\Delta i(4.2)} = \frac{R_2}{R_2 = R_3} = .42$$

where from: $R_2 = 0.72 R_3$
and when the $3f$ control is operated, we should have:
$i(4.0)/i(4.2) = 1/R_3 = -0.70$
or: $R_1 = 0.70 R_3$ The harmonics which are formed of linear combinations of the (4,1) and (4,3) harmonics as well as of the (4,1)' and (4,3)' harmonics are relatively more complex because of the (4,3) vs. (4,3)' ancillary harmonics produced by the (2,1) and (4,1) vs. (2,1)' and (4,1)' windings.

Let $\alpha_2$ be defined as the sums of the A's for all the loops of the (4,1)' winding:

$$\alpha_2 = \sum_{(4,1)'} A$$

and let $\beta_2$, $\gamma_2$ and $\delta_2$ be similarly defined as the sums of the B's for all the loops of the (4,1)', (4,3)' and (2,1)' windings respectively:

$$\beta_2 = \sum_{(4,1)'} B \quad \gamma_2 = 3 \sum_{(4,3)'} B \quad \delta_2 = \sum_{(2,1)'} B$$

the factor three for $\gamma_2$ being explained by the comments following (26). These relations indicate the calculations required for $\alpha_2$, $\beta_2$, $\gamma_2$ and $\delta_2$. The quantities A and B are tabulated hereinbefore in tables IV and V respectively, and the actual calculations are given below.

| | (4,1)'r-values | 2A-values | 2B-values |
|---|---|---|---|
| c.c.w. loops | { 0.62 | 2.48 | 0.46 |
| | 0.74 | 2.80 | 0.74 |
| c.w. loop | 1.34 | −2.42 | −1.72 |
| | | 2.86 | TOTALS | wherefrom:
$\alpha_2 = 2.86/2 = 1.43$   $\beta_2 = -0.52/2 = -0.26$

| | (4,3)'r-values | | 2B-values |
|---|---|---|---|
| c.w. loops | { 0.26 | | −0.02 |
| | 0.46 | | −0.16 | c.c.w. loops $\begin{cases} 1.02 \\ 1.26 \end{cases}$ +1.35

TOTAL +1.65
+2.82 wherefrom:
$\gamma_2 = 3(+2.82/2) = 4.23$

| | (2,1)' r-values | 2B-values |
|---|---|---|
| c.w. loops | $\begin{cases} 0.50 \\ 0.62 \end{cases}$ | −0.22 −0.47 |
| c.c.w. loops | $\begin{cases} 1.46 \\ 1.58 \end{cases}$ | +1.83 +1.92 |
| TOTAL | | +3.06 | wherefrom:

$$\partial_2 = +1.53$$

The harmonics produced by the (2,1)', (4,1)' and (4,3)' coils can be written:

$$\alpha_2 i(4,1)' \cdot (4,1)' [\beta_2 i(4,1)' + \gamma_2 i(4,3)' + \partial_2 i(2,1)'](4,3)'$$

Several conditions must be met by the network of FIG. 37 which has been designed to effect independent control of the production of the (2,1)' harmonic, and of the two harmonic combinations of the (C) and (2f) lines in the last column of the fourth degree tabulation of table VI, by means of the respective $V_2$, $V_3$ and $V_1$ voltages produced by potentiometers 332, 334 and 336 respectively and in which the $C_1$, $C_2$ and $C_3$ coil positions are assigned to the (4,3)', (4,1)' and (2,1)' coils respectively. Firstly, operation of either $V_1$ or $V_2$ must not affect the current in the (2,1)' coil. This is effected by tying the R4 and R5 resistors directly to the wiper of potentiometer 336, and making the impedance of that potentiometer suitably small when compared to R4 and R6.

Secondly, the operation of $V_3$ should not affect the current in (4,1)'. This requires that the bridge formed by R1 and R2 in parallel, R4, R5 and R2 be balanced, which will be the case if we have:

$$R_4 = \frac{cR_1 R_2}{R_1 + R_2} \text{ and } R_5 = cR_3 \quad (39)$$

where $c$ is a constant to be arbitrarily but suitably selected.

Thirdly, the coefficients of incremental (4,1)' and (4,3)' harmonics produced should be in the respective ratios of 1:5 and −1:3 respectively when the V1 and V2 voltages are varied by means of potentiometers 332 and 334. Utilizing the expression given above for the total (4,1)' and (4,3)' harmonic production, we see that we should have $$\frac{\beta_2 i(4,1)' + \gamma_2 i(4,3)'}{\alpha_2 i(4,1)'} = \begin{cases} 5 \text{ for } (c) \text{ control} \\ -3 \text{ for } (2f) \text{ control} \end{cases}$$

or inserting their values for $\alpha_2$, $\beta_2$ and $\gamma_2$ in the expression above:

$$\frac{i(4,3)'}{i(4,1)'} = \begin{cases} 1.75 \text{ for } (C) \text{ control} \\ -.95 \text{ for } (2f) \text{ control} \end{cases}$$

when the V1 or (C) control is operated, the incremental current ratios $\Delta i(4,1)'$ and $\Delta i(4,3)'$ can be expressed in terms of the network resistances as follows:

$$\frac{\Delta i(4,3)'}{\Delta i(4,1)'} = \frac{\frac{cR_1 R_2}{R_2 + (1+c)R_1} + \frac{R_3}{1+1/c}}{\frac{cR_1 R_2}{R_2 + (1+c)R_1}}$$

or $$\frac{\frac{cR_1 R_2}{R_2 + (1+c)R_1} + \frac{R_3}{1+1/c}}{\frac{cR_1 R_2}{R_2 + (1+c)R}} = 1.75$$

$$\frac{R_3}{(1+c)R_1} + \frac{R_3}{R_2} = .75$$

and when the $V_2$ or (2f) control is operated, the incremental current ratios $\Delta i(4,1)'$ and $\Delta i(4,3)'$ can be expressed likewise as follows:

$$\frac{\Delta i(4,3)'}{\Delta i(4,1)'} = -.95 = -\frac{R_3}{(1+1/c)R_1}$$

wherefrom:

$$R_1 = \frac{R_3}{.95(1+1/c)} \text{ and } R_2 = \frac{R_3}{.75 - .95/c}$$

The expression for R2 indicates that we should have $c$ 1.27, but since $c$ should be rather large since $\partial_2$ is rather small, a value anywhere between, e.g., two and 10 should be quite suitable. Once $R_1$ and $R_2$ have been determined, $R_4$ and $R_5$ are readily determined by (39).

Since $\gamma_2$ and $\partial_2$ are both positive operations of $V_3$, which will cause current to flow in the (2,1)' and (4,3)' coils in opposite directions will cause the unwanted ancillary (4,3)' harmonic generated by the (2,1)' coil to be compensated by the (4,3)' coil provided we have:

$$\frac{-\Delta i(2,1)}{\Delta i(4,3)} = -\frac{4.23}{1.53} = -\frac{(1+c)R_1}{R6}$$

whence:

$$R6 = 0.362(1+c)R_1 = 0.380 R_3$$

In what just precedes, as formerly, and as in what follows, the actual coil resistances and potentiometer 332 and 334 resistances are lumped with the resistances of the appropriate coils.

The last case to be examined is that of the (f) and (3f) controls prescribed in the last column of the fourth degree tabulation of table VI. The harmonics generated by currents in the (4,1), and (4,3) and (2,1) coils can be written:

$$\alpha_3 i(4,1) \cdot (4,1) + [\beta_3 i((4,1) + \gamma_3 i(4,3) + \partial_3 i(2,1)](4,3)$$ and the $\alpha_3$, $\beta_3$, etc., as follows:

| | (4,1) r-values | 2A-values | 2B-values |
|---|---|---|---|
| c.c.w. loops | $\begin{cases} 0.66 \\ 0.70 \end{cases}$ | 2.62 2.74 | 0.55 0.65 |
| c.w. loops | 1.30 | −2.46 | −1.70 |
| TOTALS | | 2.90 | −0.50 | wherefrom:
$\alpha_3 = 2.90 = 1.45$   $\beta_3 = -0.50 = -0.25$

| | (4,3) r-values | 2B-values |
|---|---|---|
| c.w. loops | $\begin{cases} 0.30 \\ 0.42 \end{cases}$ | −0.03 −0.14 |
| c.c.w. loops | $\begin{cases} 1.06 \\ 1.22 \end{cases}$ | +1.41 +1.60 |
| TOTAL | | +2.84 | wherefrom $\gamma_3 = 3(+2.84/2) = 4.26$

| | (2,1) r-values | 2B-values |
|---|---|---|
| c.w. loops | $\begin{cases} 0.54 \\ 0.58 \end{cases}$ | −0.30 −0.39 |
| c.c.w. loops | $\begin{cases} 1.34 \\ 1.70 \end{cases}$ | +1.73 +1.98 |
| TOTAL | | +3.02 | wherefrom $$\partial_3 = +1.51$$

The circuit of FIG. 37 is utilized as formerly and the new conditions for the currents become:

$$\frac{\beta_3 i(4,1) + \gamma_3 i(4,3)}{\alpha_3 i(4,1)} = \begin{cases} 15 \text{ for } f \text{ control} \\ -1 \text{ for } 3f \text{ control} \end{cases}$$

and we obtain:

$$\frac{i(4,3)}{8(4,1)} = \begin{cases} 5.17 \text{ for } f \text{ control} \\ -.283 \text{ for } 3f \text{ control} \end{cases}$$

and eventually:

$$R_2 = \frac{R_3}{4.17 - .283/c} \quad R_1 = \frac{R_3}{.283(1+1/c)}$$

$$R_6 = \frac{1.51}{4.26} \quad (1+c)R_1 = 1.25cR_3$$

$R_4$ and $R_5$ being determined by an application of (39) as for the preceding case.

The generation of an improved arrangement of field-homogenizing coils has thus been described. The circumferential positions of the radial segments is selected by inspection so as to provide adequate separation between electroconductors. The resultant physical configuration of the electroconductors is illustrated in FIGS. 3 and 4. Electroconductors for a particular primary function are indicated by the function symbols adjacent the current terminals for the electroconductor. Each complete function is formed by connecting, in series, the two homogenizing electroconductors of a pair symmetrically disposed on the opposite pole pieces, following the rule that the currents in the two coils are also symmetric when $n+m$ is odd, and asymmetric when $n+m$ is even. As illustrated in FIG. 2, each corrective electroconductor is suitably connected to an adjustable source of DC current, and the current optimized for optimum field homogeneity.

An improved arrangement of shim coils for increasing the uniformity of the magnetic field for stationary and rotating samples in a NMR apparatus has thus been described. The arrangement is particularly advantageous in that a relatively large number of orthogonally related primary spherical harmonic functions are provided by electroconductors occupying a relatively small portion of the magnet gap, while interference from ancillary generated harmonics is reduced. In addition, the described uniform arrangement of arcuate segments provides a facility for increasing the number of spherical harmonic functions as desired.

While I have illustrated and described a particular embodiment of my invention, it will be understood that various modifications may be made therein without departing from the spirit of the invention and the scope of the appended claims.

I claim:

1. In an NMR apparatus having means for establishing a magnetic field of predetermined magnitude in a gap between first and second magnet pole faces, a means for reducing inhomogeneities occurring in the magnetic field comprising: first and second plates formed of an electrically insulating material positioned in the gap near said first and second pole pieces respectively, said plates each supporting a plurality of spaced-apart electroconductors having segments thereof formed on opposite surfaces of plates, each of said electroconductors adapted to establish a magnetic field representable by a distinct spherical harmonic function when a current flows therein and circuit means for causing a current to flow in each of said electroconductors for homogenizing said field.

2. The apparatus of claim 1 wherein said electroconductors comprise generally arcuate and radial segments.

3. The apparatus of claim 1 wherein said electroconductors are formed of relatively flat generally arcuate and radial segments and are positioned in a manner for providing orthogonality between primary spherical harmonic functions $(n_\mu, m_\mu)$ which are representative of the magnetic potentials generated by said electroconductors.

4. The apparatus of claim 3 wherein said homogenizing electroconductors comprise circular segments for providing a primary spherical harmonic potential function of degree $n$ and order $m=0$.

5. The apparatus of claim 3 wherein said homogenizing electroconductors comprise arcuate segments arranged as a plurality of generally semicircular segments connected to radial segments for generating a primary spherical harmonic potential function of degree $n$ and order $m=1$.

6. The apparatus of claim 3 wherein said homogenizing electroconductors comprise arcuate segments arranged in a configuration of a plurality of generally quarter-circular segments connected to radial segments for generating a primary spherical harmonic potential function of degree $n$ and order $m=2$.

7. In an atomic analysis apparatus having means for establishing a magnetic field of predetermined magnitude in a gap between first and second pole faces, a means for reducing inhomogenities in the magnetic field comprising: first and second plates positioned in the gap near said first and second pole faces respectively;

said plates each comprising an insulative material having a relatively thin conductive material mounted on opposite sides of the insulative material;

said thin conductive materials on each of said plates forming a plurality of electrically insulated electroconductors adapted to establish an equal plurality of corrective magnetic fields which are defined by primary spherical harmonic potential functions of order $m=0, 1,$ and 2;

said electroconductors including arcuate segments and spaced relatively in a manner for providing substantial orthogonality between fields the potentials of which are primary spherical potential functions $(n_\mu, m_\mu)$;

said arcuate segments for establishing a primary spherical harmonic potential function of order $m=0$ arranged in a generally circular configuration;

said arcuate segments for establishing a primary spherical harmonic potential function of order $m=1$ arranged in a plurality of generally semicircular segments connected to radial segments;

said arcuate segments for establishing a primary spherical harmonic potential function of order $m=2$ arranged in a plurality of generally quarter-circular segments connected to radial segments; and means for causing current to flow in each of said electroconductors for homogenizing said field.

8. The apparatus of claim 7 wherein the arcuate segments are interconnected by radial extending segments formed from the conductive material on the opposite surface of the insulative material.

9. The apparatus of claim 7 including additional pairs of plates arranged for providing additional primary spherical harmonic potential functions.

10. In an atomic analysis apparatus having magnet means for establishing a magnetic field $H_1$ of predetermined magnitude in a gap between first and second pole faces of the magnet, a means for reducing inhomogenities in the magnetic field comprising:

first and second plates positioned in the gap near said first and second pole faces respectively, said plates each supporting a plurality of electrically insulated electroconductors formed in a same plane, each of said electroconductors having a substantially uniform cross section and adapted for establishing a distinct corrective magnetic field the potential of which is representable by a spherical harmonic function;

a one of said electroconductors adapted to establish a magnetic field potential representable by a primary spherical harmonic function of degree $n=1$ and order $m=0$; and, circuit means for causing currents of separately adjustable magnitude to flow in each of said electroconductors for homogenizing said field $H_1$.

11. In a nuclear magnetic resonance apparatus having means for establishing a magnetic field of predetermined magnitude in a gap between first and second magnet pole faces, a means for reducing inhomogenities occurring in the magnetic field comprising:

a plurality of windings positioned between said pole faces, each of said windings arranged for establishing a primary magnetic field representable by a distinct spherical harmonic function of particular degree and order and simultaneously creating ancillary magnetic fields in said gap when a current of predetermined amplitude flows therein;

first circuit means for providing a separate electrical current flow path between each of said windings and a current source for homogenizing said field;

a current flowing in a first homogenizing coil of a first electrical current flow path creating an ancillary magnetic field which interferes with a primary magnetic field created by a current flowing in a homogenizing winding of a second electrical current flow path; and an electrical impedance coupled between said first and second current flow paths for applying a portion of a current flowing in said first path to said second path, said impedance having a magnitude for applying a current to said second circuit having an amplitude for cancelling the interference of said ancillary field on the primary field of said second circuit winding.

12. The apparatus of claim 11 wherein said plurality of homogenizing windings includes windings adapted for generating homogenizing fields the potentials or which are combinations of the spherical harmonic functions of the degree and order (2,1), (4,1) and (4,3), and said electrical impedance means is arranged for linearly adding currents proportional to currents flowing in the (2,1) and (4,1) windings to the current flowing in the (4,3) winding to reduce interference of fields generated by the former on the field of the latter winding.

13. The apparatus of claim 11 wherein said plurality of windings includes windings adapted for generating homogenizing fields the potentials of which are combinations of the spherical harmonic functions of the degree and order (2,1)', (4,1)' and (4,3)', and said electrical impedance means is arranged for linearly adding currents proportional to those flowing in the (2,1)' and (4,1)' winding to the current flowing in the (4,3)' winding to reduce interference of fields generated by the former on the field of the latter winding.

* * * * *